(12) United States Patent
Cayley, Sr. et al.

(10) Patent No.: US 9,950,867 B2
(45) Date of Patent: Apr. 24, 2018

(54) DELIVERY SYSTEM AND RECEIVER FOR MOVING WORKPIECES

(71) Applicant: MIDACO CORPORATION, Elk Grove Village, IL (US)

(72) Inventors: Michael Paul Cayley, Sr., South Barrington, IL (US); Timothy J. Hilger, Lagrange Park, IL (US)

(73) Assignee: MIDACO CORPORATION, Elk Grove Village, IL (US)

( * ) Notice: Subject to any disclaimer, the term of this patent is extended or adjusted under 35 U.S.C. 154(b) by 0 days.

(21) Appl. No.: 15/221,192

(22) Filed: Jul. 27, 2016

(65) Prior Publication Data

US 2018/0029799 A1    Feb. 1, 2018

(51) Int. Cl.
| B65G 37/00 | (2006.01) |
| B65G 17/12 | (2006.01) |
| B65G 17/34 | (2006.01) |

(52) U.S. Cl.
CPC ............. *B65G 17/12* (2013.01); *B65G 17/34* (2013.01)

(58) Field of Classification Search
CPC .......... B65G 17/12; B65G 17/34; B23Q 7/10; B23Q 7/1431; B23Q 7/1426
USPC ......... 198/346.1, 346.2; 414/222.07, 222.13; 29/33 P
See application file for complete search history.

(56) References Cited

U.S. PATENT DOCUMENTS

| | | | |
|---|---|---|---|
| 4,034,465 A * | 7/1977 | Shelton | B23Q 3/157 29/26 A |
| 4,185,376 A * | 1/1980 | Johnstone | B23B 49/001 408/56 |
| 4,266,120 A * | 5/1981 | Johnstone | B23B 49/001 377/2 |
| 5,044,486 A * | 9/1991 | Kitamura | B23Q 7/10 198/346.1 |
| 5,172,464 A * | 12/1992 | Kitamura | B23Q 1/5406 198/346.1 |
| 6,161,994 A | 12/2000 | Lang | |
| 6,474,914 B1 | 11/2002 | Lang | |
| 6,530,567 B1 | 3/2003 | Lang | |
| 6,799,757 B1 | 10/2004 | Lang | |
| 7,975,998 B2 | 7/2011 | Keith et al. | |
| 8,020,877 B2 | 9/2011 | Lang | |
| 8,474,599 B2 | 7/2013 | Keith et al. | |
| 9,133,867 B2 | 9/2015 | Lang | |
| 9,144,870 B2 * | 9/2015 | Cayley, Sr. | B23Q 7/1431 |

OTHER PUBLICATIONS

Co-pending U.S. Appl. No. 15/221,233, Michael Paul Cayley, Sr., et al., "Delivery System and Receiver for Moving Workpieces," filed Jul. 27, 2016.

* cited by examiner

*Primary Examiner* — William R Harp

(74) *Attorney, Agent, or Firm* — Pauley Erickson & Kottis

(57) ABSTRACT

A method and apparatus for delivering and retrieving workpieces to and from a machine table. This invention also relates to an apparatus for receiving at the machine table workpieces which are delivered to and retrieved by the delivery system. Carriers move along a conveyor without a loading arm rotating with respect to a supply table and also without the supply table rotating with respect to the loading arm. The receiver has pivot arms that act in a scissor-like manner to open and close an opening that lockingly engages a connector connected to a pallet.

19 Claims, 26 Drawing Sheets

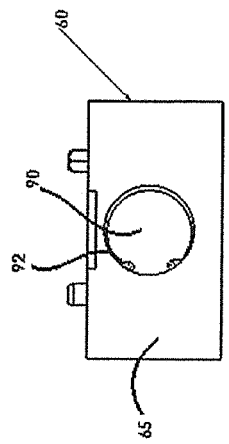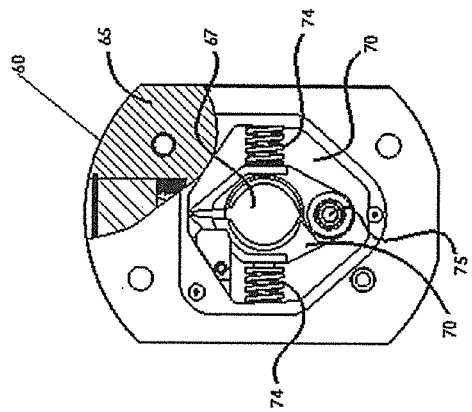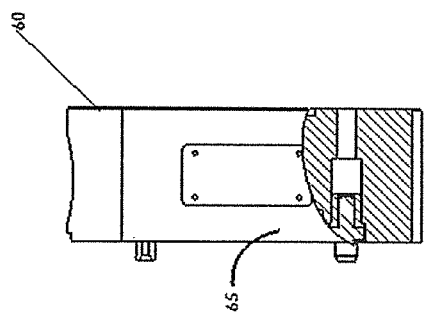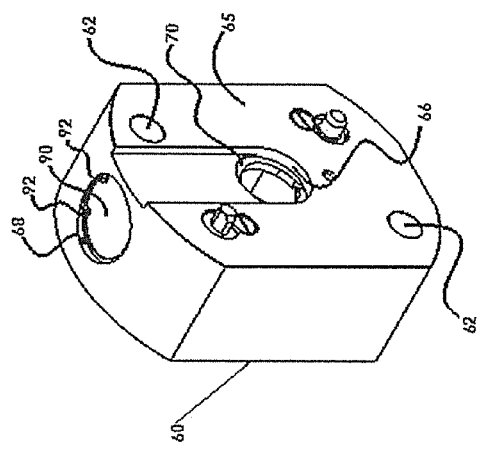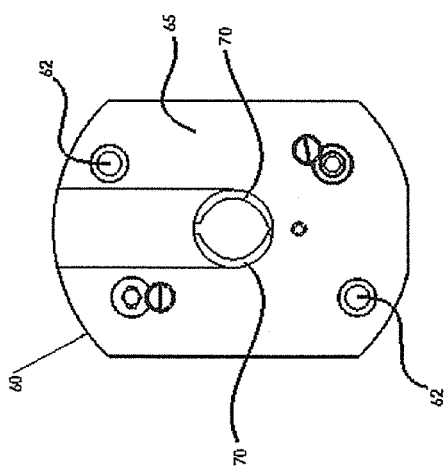

SECTION A-A

SECTION A-A

DELIVERY SYSTEM AND RECEIVER FOR MOVING WORKPIECES

BACKGROUND OF THE INVENTION

Field of the Invention

This invention relates to a system and method for delivering and retrieving workpieces to and from a machine table, such as a 5-axis machine table. This invention also relates to a system and method for receiving workpieces at the machine table.

Discussion of Related Art

Delivery systems are known for moving workpieces from a staging or supply area or location to a machine table, such as a 5-axis machine table. Many conventional delivery systems have a loading arm or similar element that rotates to pick up pallets holding workpieces. Other conventional delivery systems rotate the loading arm with respect to a table to pick up workpieces.

The conventional delivery systems have substantial footprints and thus require a significant amount of manufacturing floor space, which is relatively expensive. There is no apparent need for a delivery system that has a loading arm that moves in a linear direction to pick up workpieces.

SUMMARY OF THE INVENTION

The delivery system of this invention provides access to workpieces or other materials to be modified without a requirement for a loading arm to rotate or pivot to pick up workpieces. The delivery system of this invention uses a conveyor or track along which multiple carriers each moves into a position in which a linearly displaceable loading arm can move within two dimensions to pick up, move, deliver and/or retrieve pallets to and from a machine table. Each pallet has an attached workpiece and each pallet is releasably attached to one of the carriers. The delivery system of this invention also uses movers to move carriers to a transfer station for the loading arm, rather than the loading arm rotating or pivoting to pick up the carriers, and thus eliminates the need for a loading arm to rotate to pick up carriers, which results in significant manufacturing and use cost reductions.

The loading arm of this invention accesses and delivers pallets, with attached workpieces, to the machine table. A receiver of this invention can be mounted at an existing machine table, such as a 5-axis machine table, or can be mounted at a new machine table. The receiver of this invention can remain at the machine table and can accept pallets with attached workpieces, and the pallets can be delivered by the delivery system of this invention. The machine table can then machine or otherwise work the workpieces locked with respect to the receiver and then return the machined or worked workpieces on the receiver for the delivery system to retrieve, move and store at a facility.

BRIEF DESCRIPTION OF THE DRAWINGS

The above and other features and objects of this invention are better understood from the following detailed description taken in view of the drawings wherein:

FIG. 17 is a perspective view of a receiver, according to one embodiment of this invention;

FIG. 18 is a partial sectional top view of a receiver, according to one embodiment of this invention;

FIG. 19 is a partial sectional side view of a receiver, according to one embodiment of this invention;

FIG. 20 is a bottom view of a receiver, according to one embodiment of this invention;

FIG. 21 is a rear view of a receiver, according to one embodiment of this invention;

DETAILED DESCRIPTION OF THE INVENTION

Figure 1:
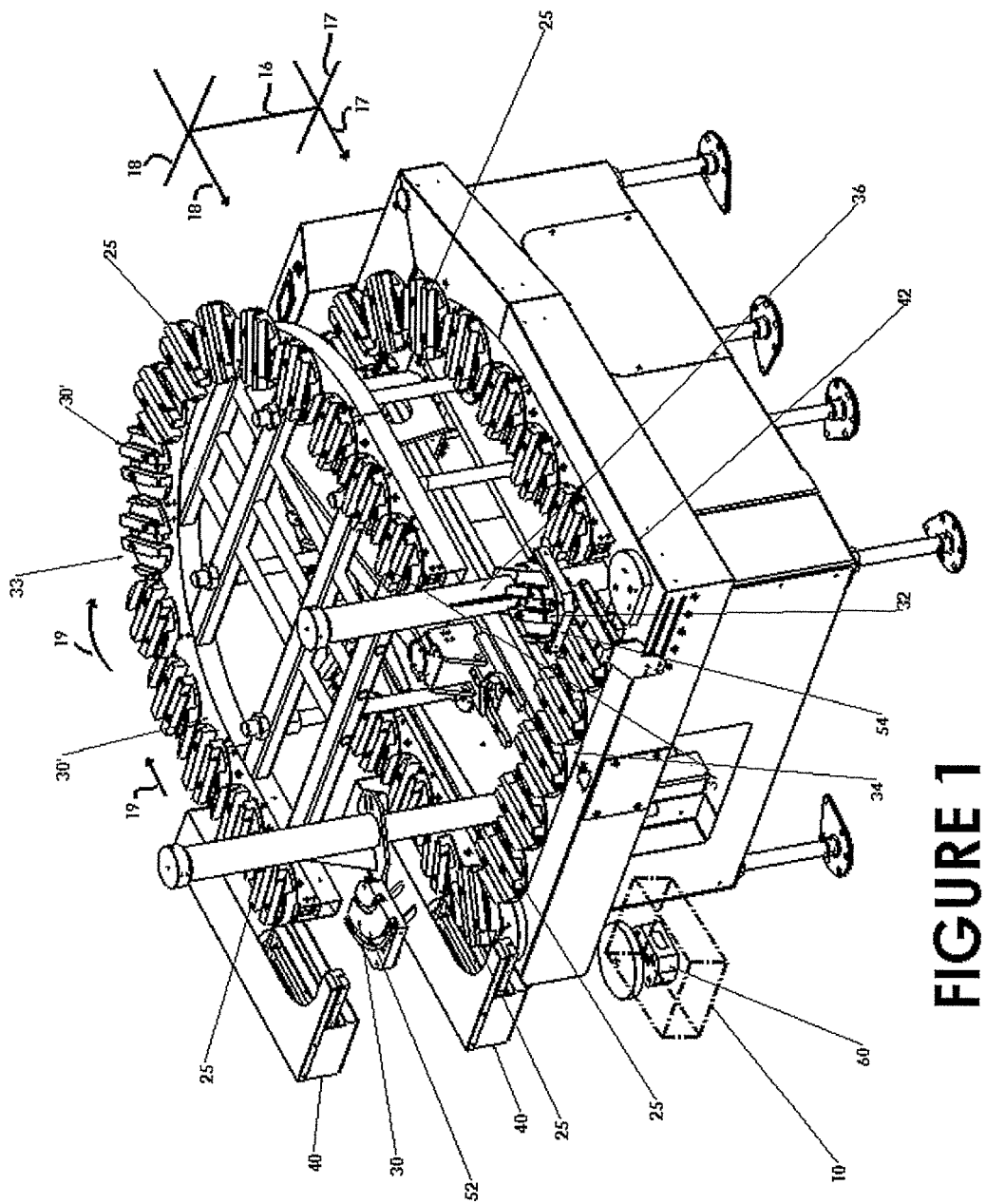
FIG. 1 is a perspective view of an apparatus for delivering and retrieving workpieces, according to one embodiment of this invention.

FIGS. 1-3 and 37 show perspective views of an apparatus, according to different embodiments of this invention, which can be part of a delivery system, for example, to deliver workpieces 12 to machine table 10. The apparatus of this invention can have any suitable layout, size, shape and/or dimensions that are suitable for any particular use. In some embodiments of this invention, machine table 10, such as shown by the dashed lines in FIG. 1, is a machine table, such as a 5-axis machine table known to those skilled in the art of manufacturing. Machine table 10 can be any other suitable device, apparatus and/or system that accepts, works, modifies and/or returns one or more workpieces 12.

Figure 3:
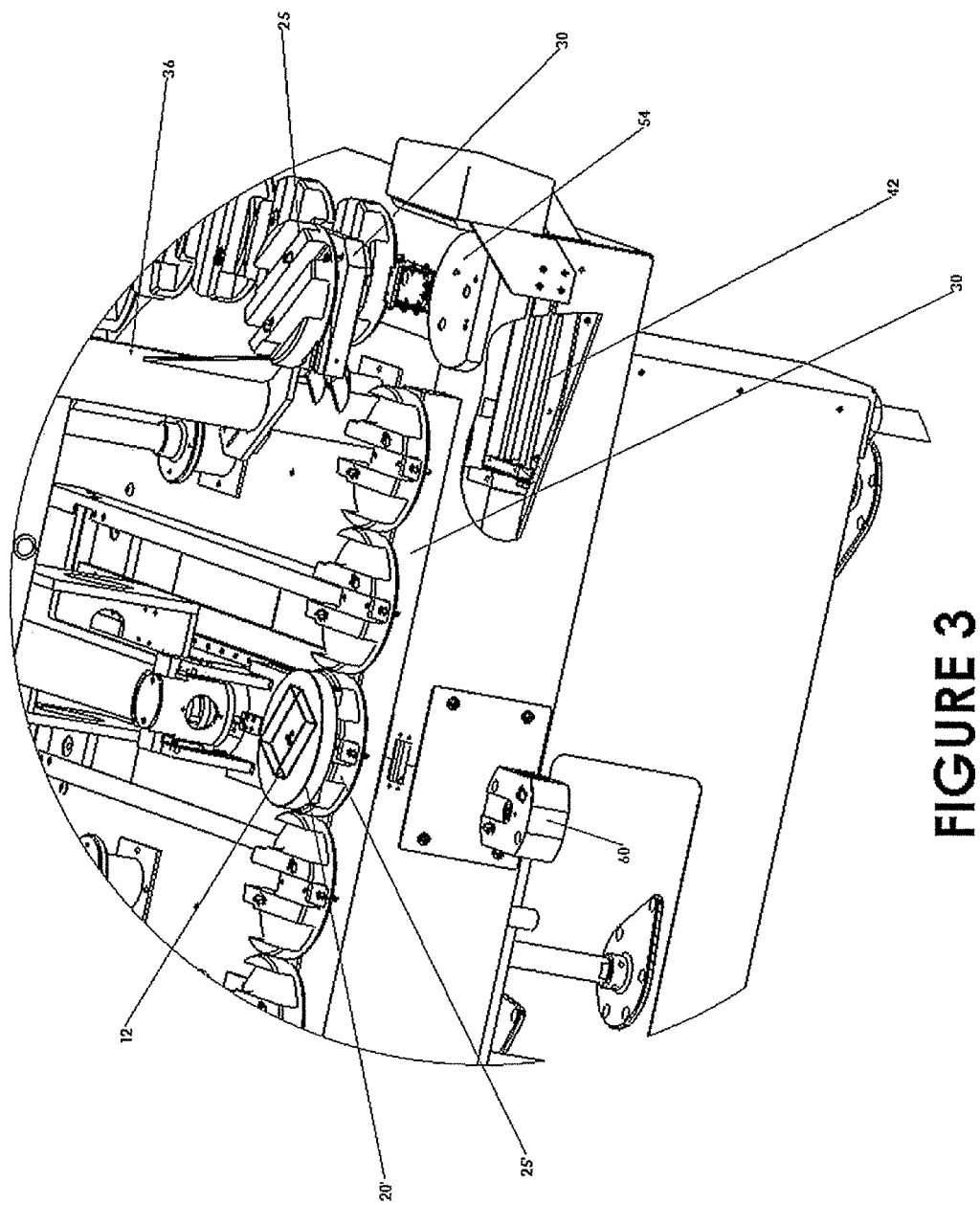
FIG. 3 is a perspective partial view of an apparatus for delivering and retrieving workpieces, according to another embodiment of this invention.
Figure 12:
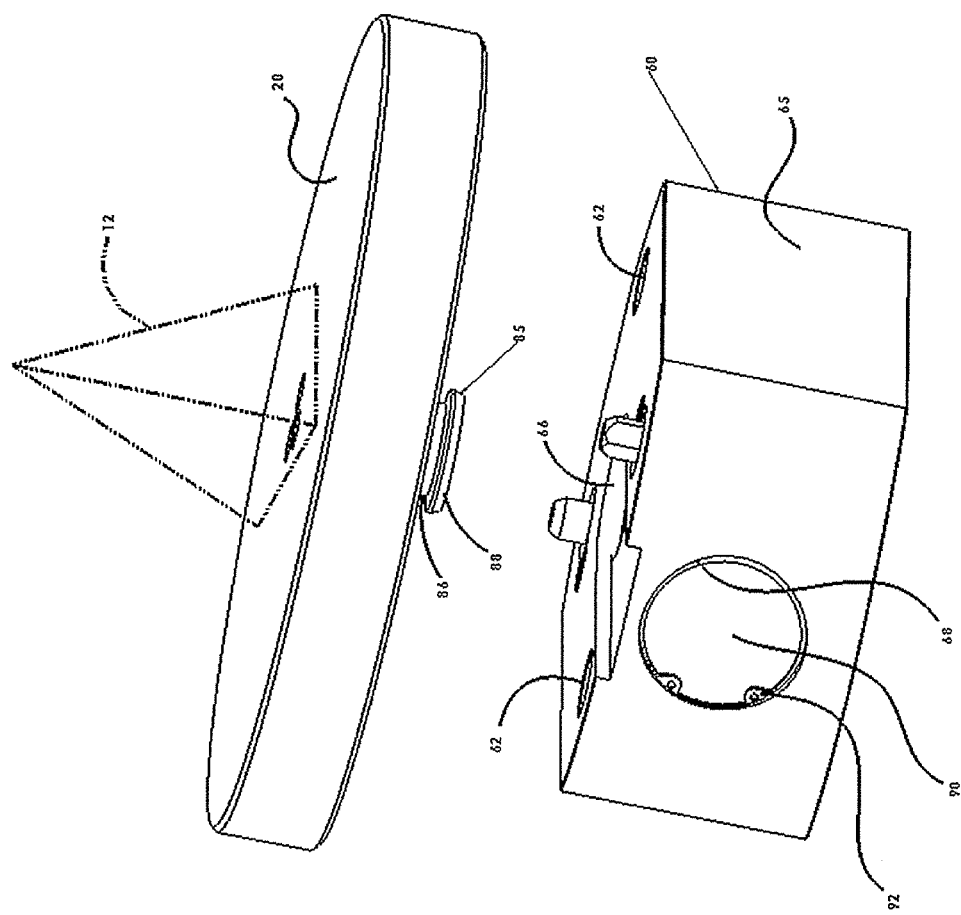
FIG. 12 is a perspective exploded or disengaged view of a pallet and a receiver, according to one embodiment of this invention.
Figure 13:
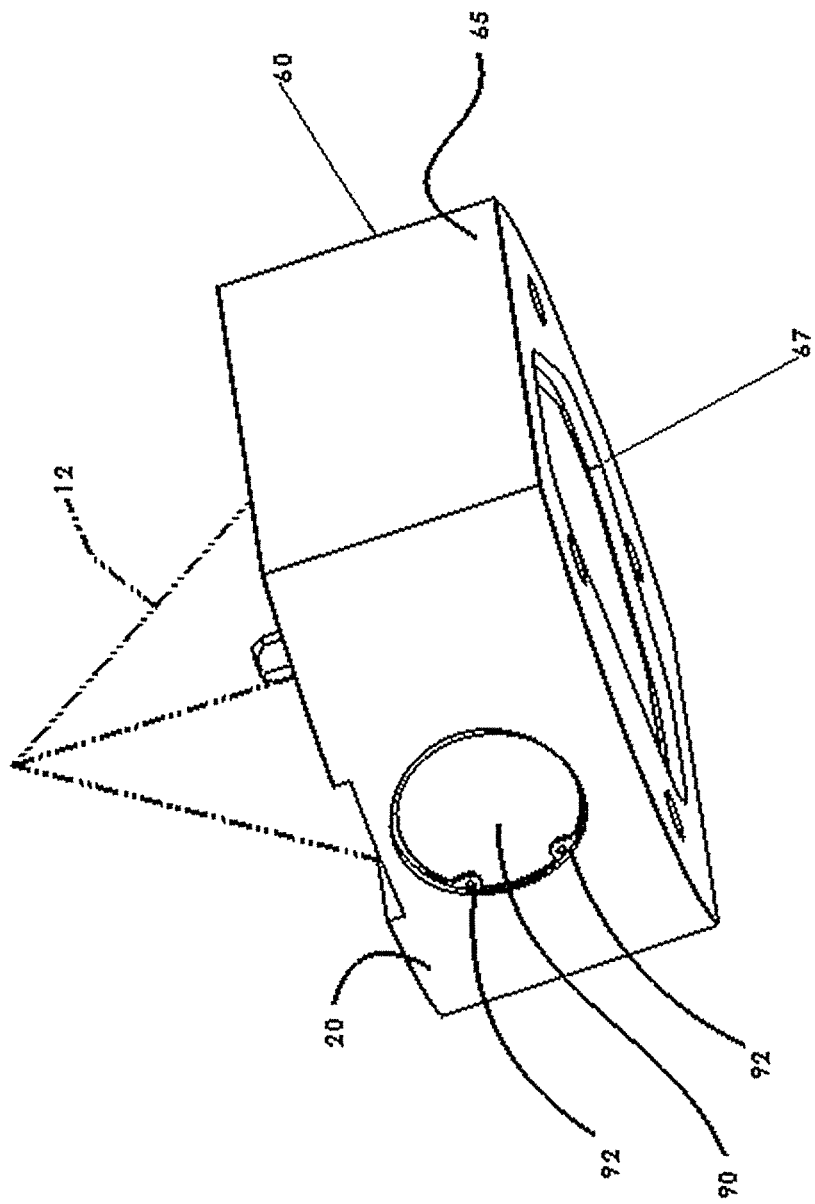
FIG. 13 is a perspective view of a pallet and a receiver, according to one embodiment of this invention.

In some embodiments of this invention, a method for delivering and retrieving workpieces 12, such as to and from machine table 10, includes securing each workpiece 12 with respect to a corresponding one of pallets 20, such as shown in FIGS. 3, 12 and 13. Any suitable apparatus or device can be used to secure workpiece 12 with respect to pallet 20, which are known to those skilled in the art of manufacturing. In some embodiments of this invention, workpiece 12 is removably secured and/or attached with respect to pallet 20, directly or indirectly.

Figure 37:
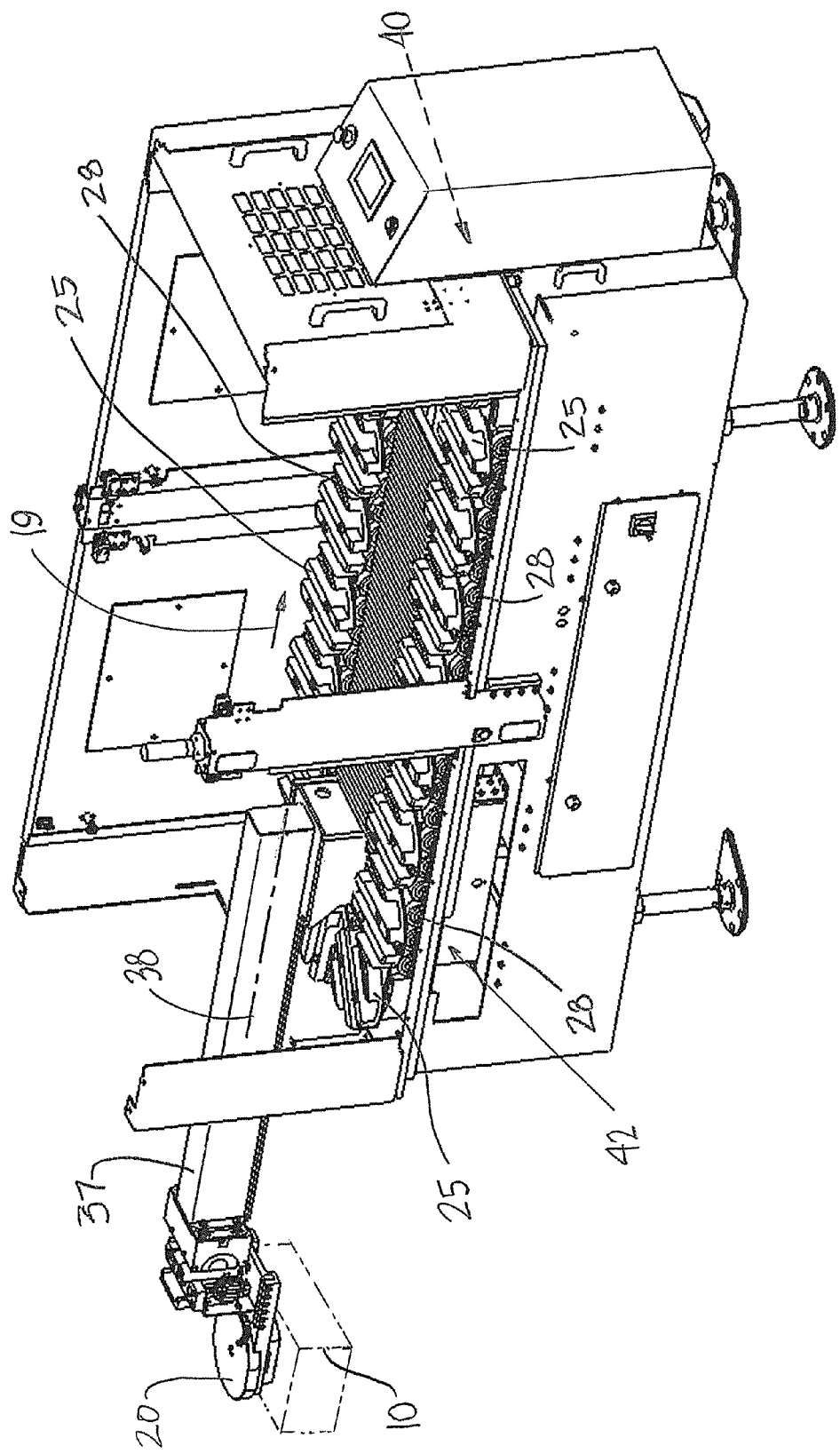
FIG. 37 is a perspective view of an apparatus for delivering and retrieving workpieces, according to one embodiment of this invention.

In some embodiments of this invention, pallet 20 is detachably mounted or removably mounted, directly, indirectly and/or otherwise with respect to carrier 25. According to some embodiments of this invention, each of a plurality of carriers 25 moves with respect to conveyor 30. In some embodiments, conveyor 30 forms a continuous loop around which a plurality of carriers 25 move, and in other embodiments conveyor 30 forms a path that may not be a continuous loop. In different embodiments of this invention, conveyor 30 can form a loop with a plan layout, for example, that is shaped as an oval, that is shaped like as shown in FIG. 37 with 2 opposing straight sections between 2 opposing curved ends, and/or that is shaped in any other suitable manner to form a continuous loop or a non-continuous loop. Conveyor 30 can be a rail, a track, an elongated member and/or any other suitable device or apparatus that allows carrier 25 to move along conveyor 30, preferably but not necessarily without derailing from or jumping off of conveyor 30.

As shown in FIGS. 1-3 and 37, moving one carrier 25 contacts and moves at least one other carrier 25 or adjacent carrier 25. In some embodiments of this invention, about 10-25 adjacent carriers 25 are positioned on one conveyor 30 and moving one carrier 25 moves at least one other carrier 25 along or with respect to the corresponding conveyor 30.

FIGS. 3, 12 and 13 each shows one workpiece 12 mounted or otherwise secured with respect to one pallet 20. In other embodiments of this invention, it is possible to mount or otherwise secure two or more workpieces 12 with respect to one pallet 20.

Figure 4:
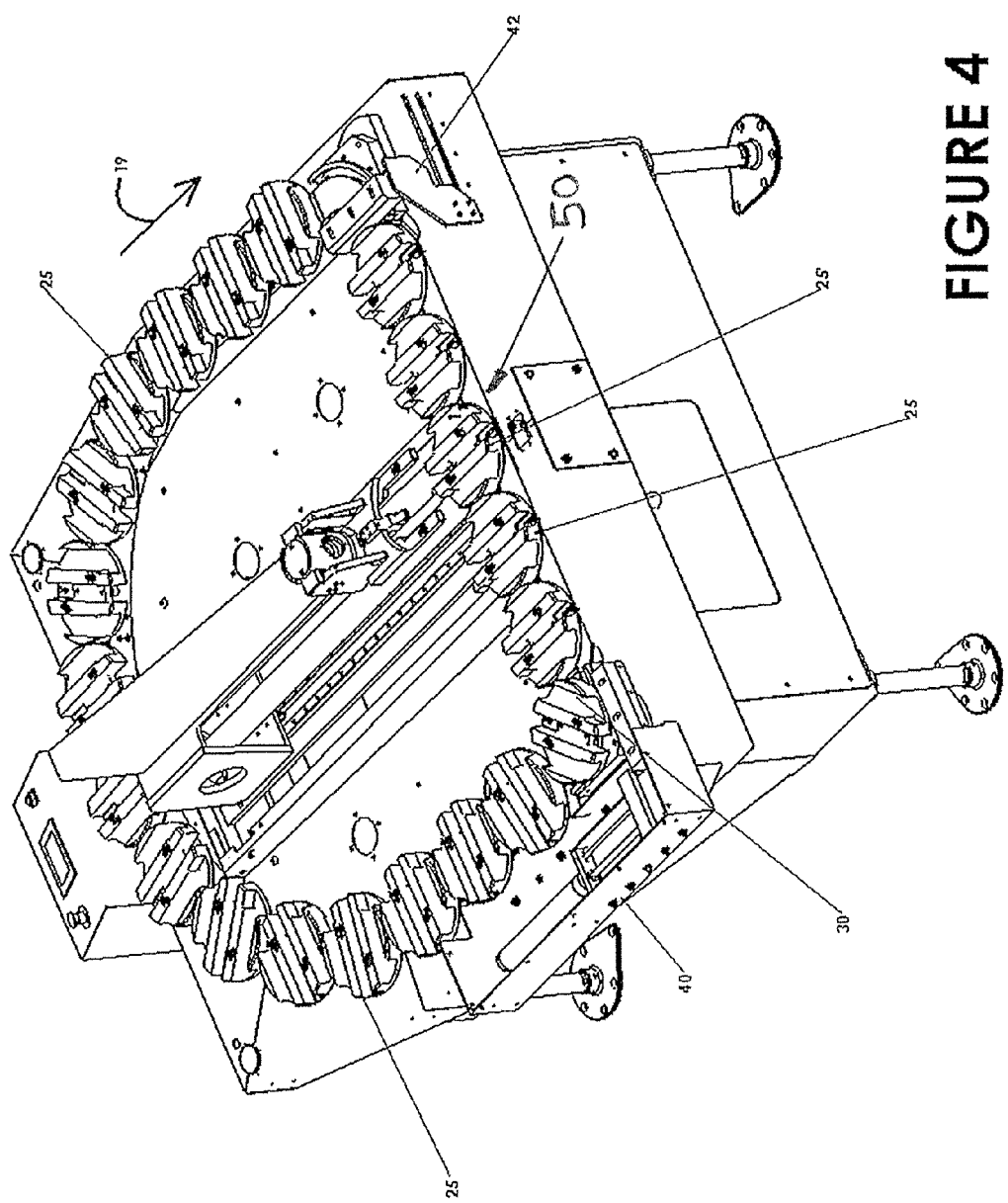
FIG. 4 is a perspective view of an apparatus for delivering and retrieving workpieces, according to another embodiment of this invention.
Figure 5:
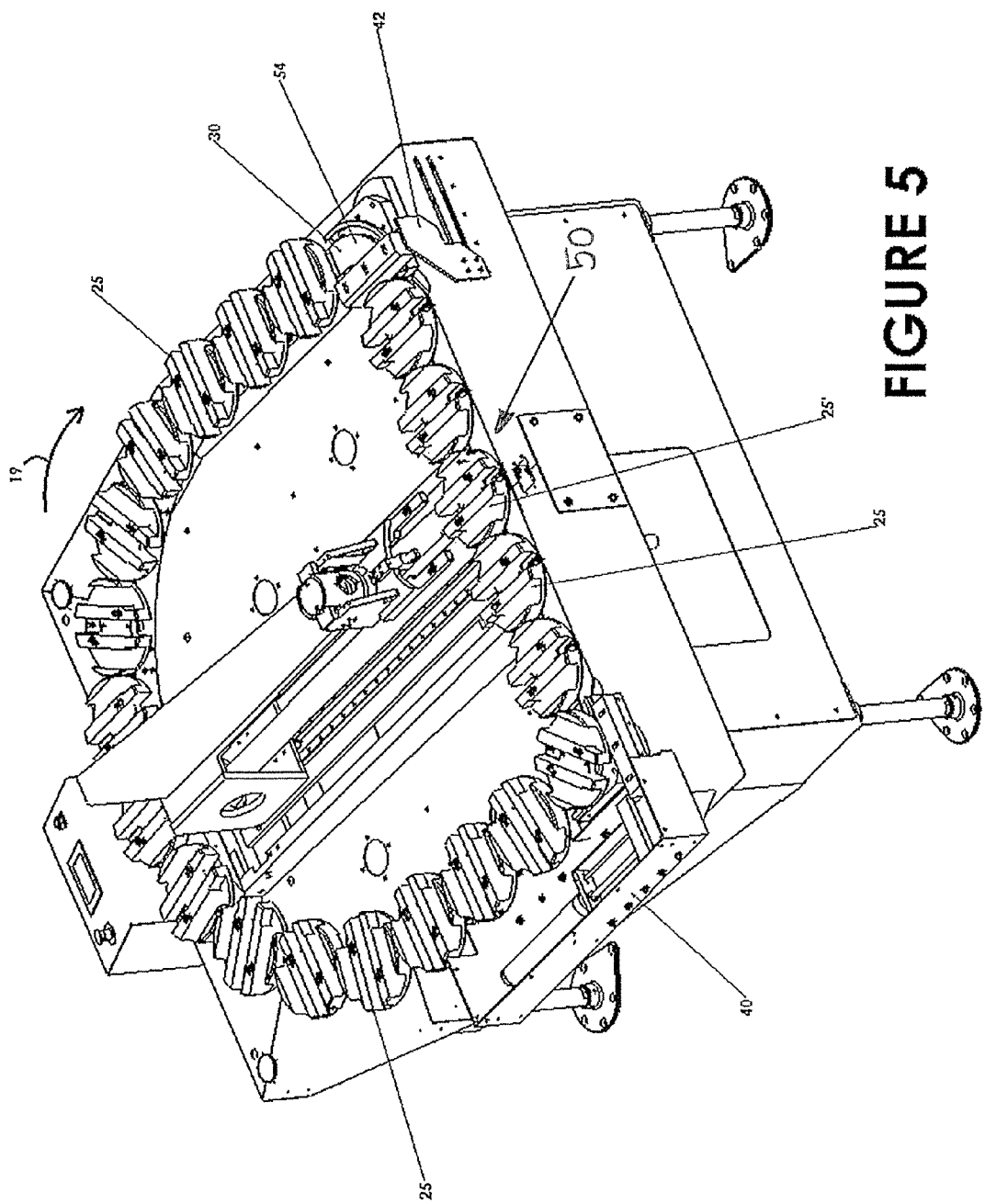
FIG. 5 is a perspective view of an apparatus for delivering and retrieving workpieces, according to another embodiment of this invention.
Figure 6:
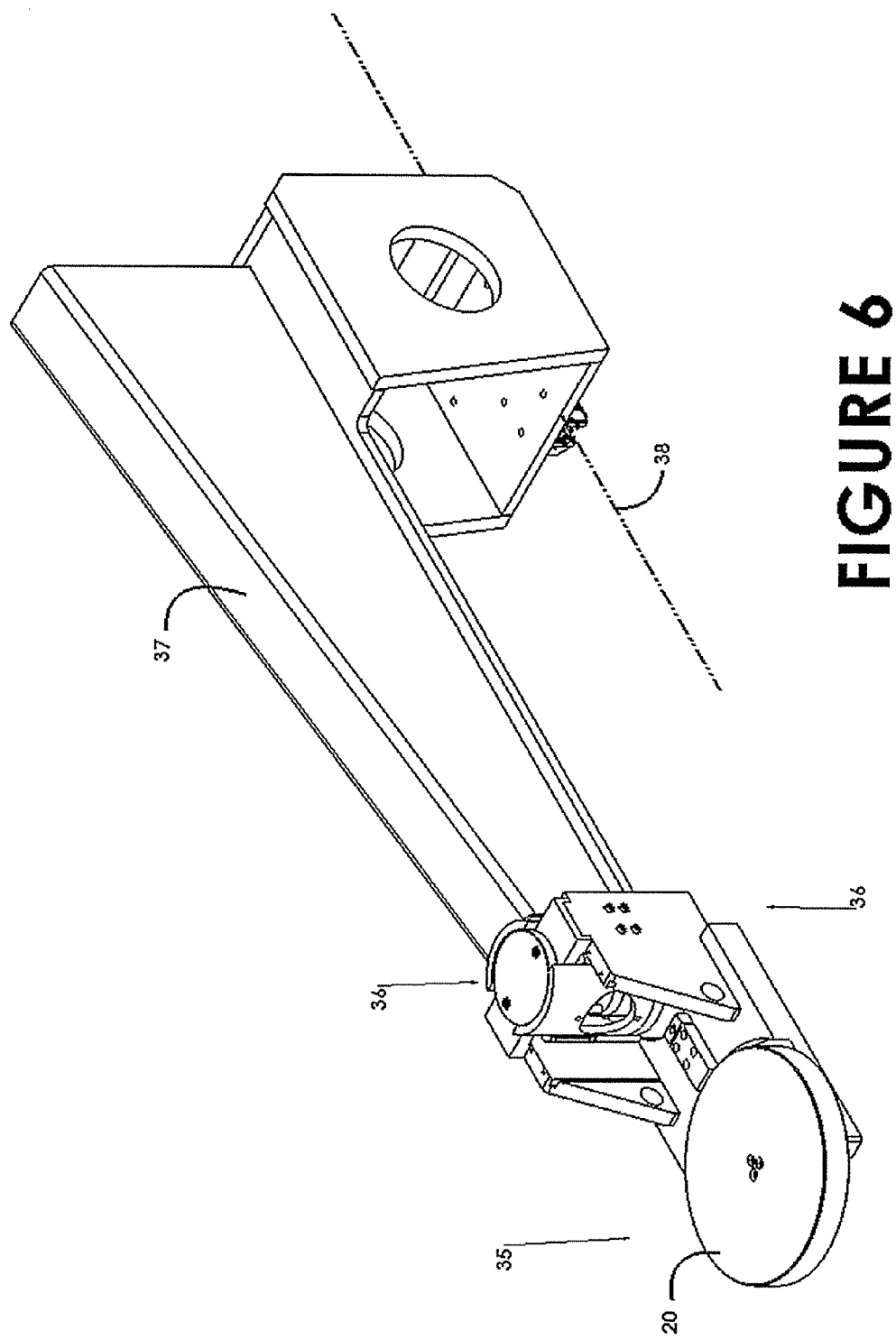
FIG. 6 is a perspective view of a loading arm, according to one embodiment of this invention.
Figure 7:
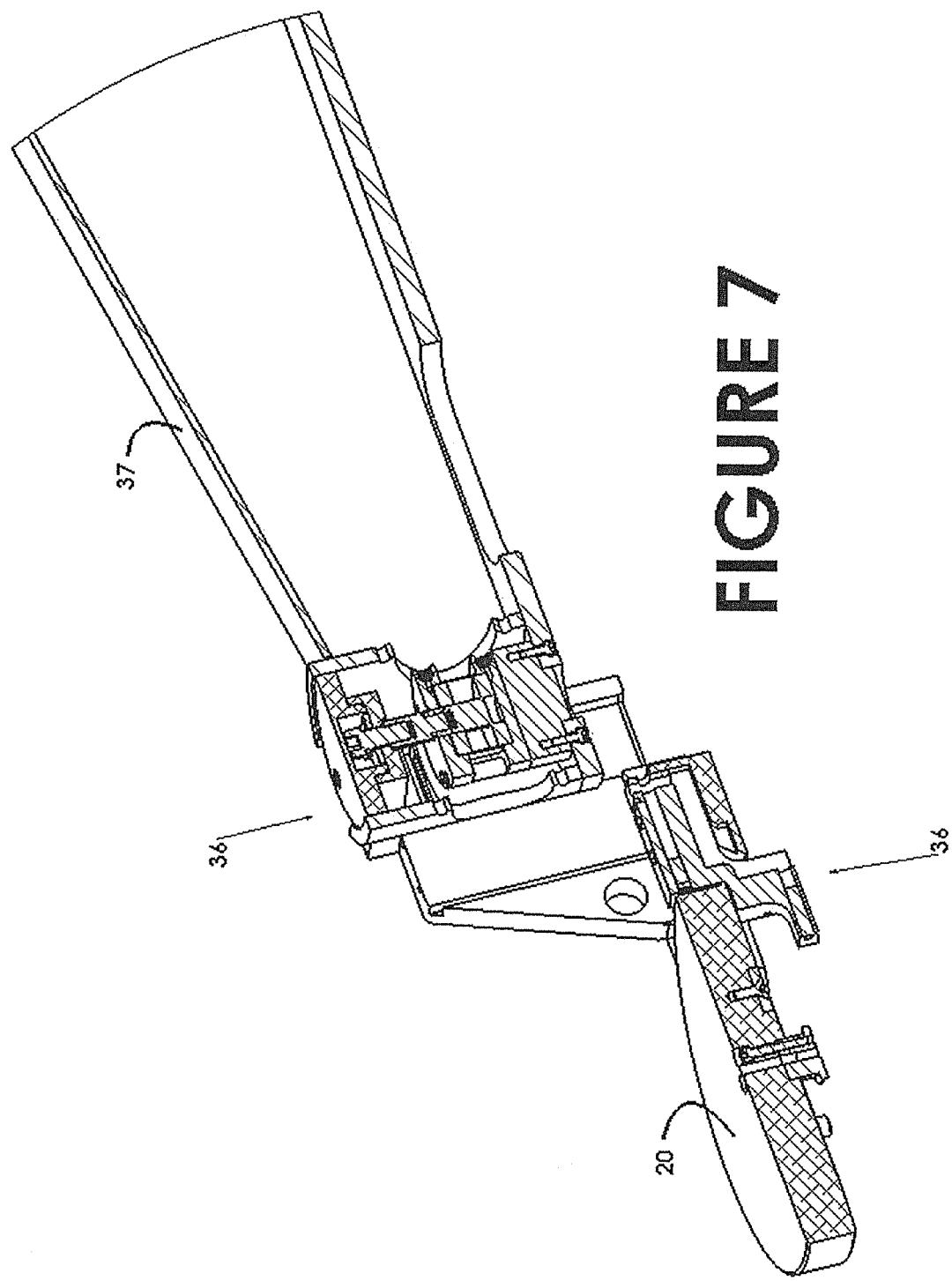
FIG. 7 is a perspective sectional view of the loading arm, as shown in FIG. 6.

FIGS. 3-5 and 38 each shows carrier 25 being an active carrier 25 when positioned at transfer station 50. In some embodiments of this invention, loading arm 37 moves along a travel path to pick up or lift pallet 20 away from carrier 25, such as at transfer station 50, and delivers pallet 20 with the mounted or secured workpiece 12 from transfer station 50 to machine table 10. According to some embodiments of this invention, loading arm 37 moves along a linear travel path to pick up or lift pallet 20, sometimes in a fashion in which loading arm 37 does not move from side-to-side, such as along a width of loading arm 37. The linear travel path, particularly of loading arm 37 can reduce costs, because there is no need or requirement to move loading arm 37 in a direction perpendicular to or in a direction at any other angle or even in a rotatable manner. As shown in FIGS. 1 and 3, lifter 36 raises and/or lowers pallet 20 with respect to loading arm 37. Any suitable hydraulic, electrical, magnetic and/or other lifting device can be used to accomplish raising and/or lowering pallet 20 with respect to loading arm 37. As shown in FIGS. 6 and 7, supports, such as support arms, can be positioned to engage and lift and/or raise pallet 20 with respect to loading arm 37.

Figure 2:
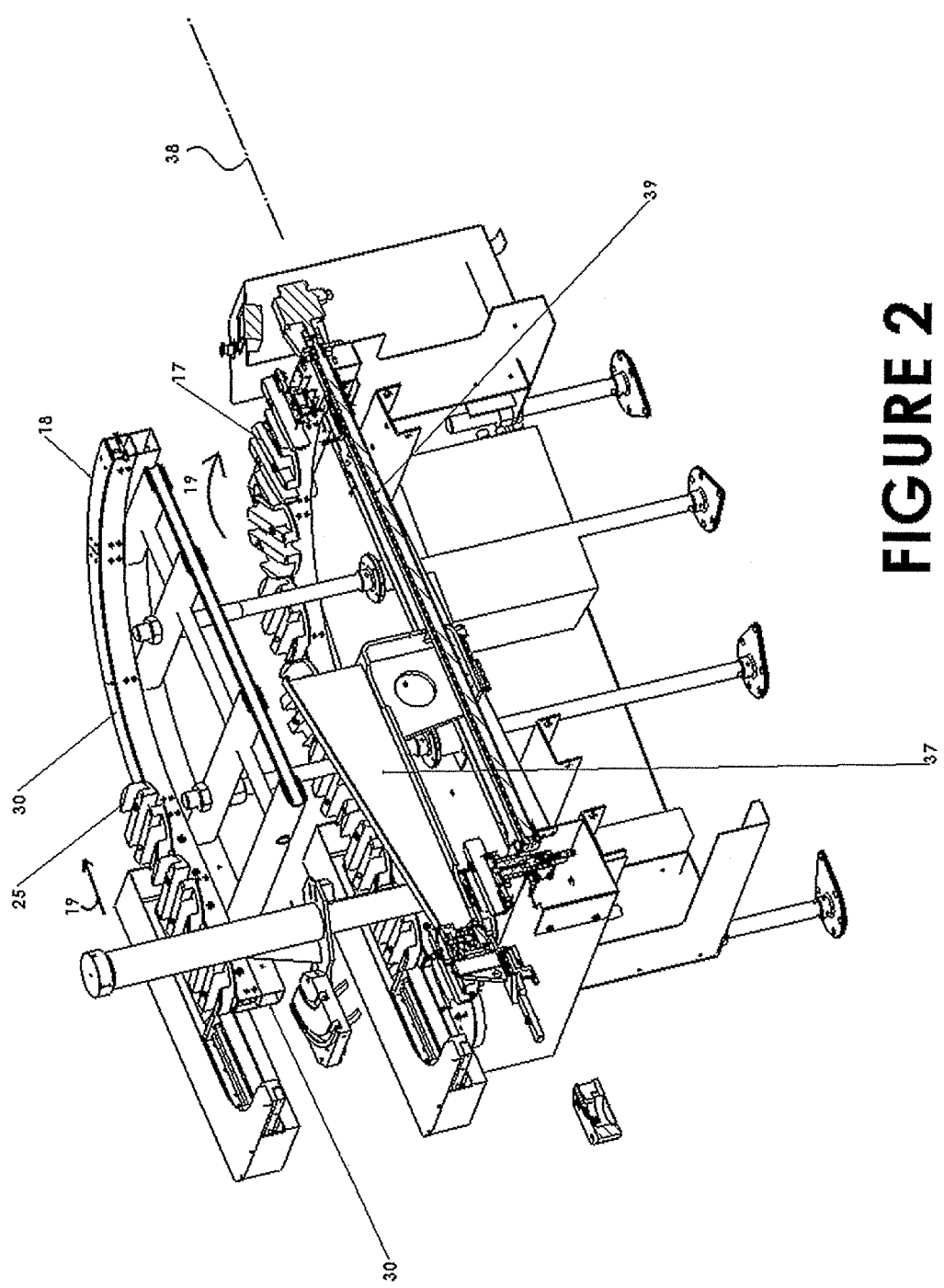
FIG. 2 is a perspective sectional view taken along a longitudinal axis of an apparatus for delivering and retrieving workpieces, according to another embodiment of this invention.

Costs of building and operating loading arm 37 can be reduced, for example, by limiting movement of loading arm 37 in only two dimensions. In some embodiments according to this invention, loading arm 37 moves or operates in only two dimensions by loading arm 37 moving between transfer station 50 and machine table 10 only in a planar air space or void having a length, a width and a depth forming boundaries of the planar air space. In some embodiments of this invention, such as shown in FIGS. 1, 2 and 37, loading arm 37 moves forward and backward, such as along longitudinal axis 38 of loading arm 37. FIG. 2 shows loading arm 37 movably mounted with respect to shaft 39, which in some embodiments of this invention can be a rotating screw shaft and/or any other suitable moving shaft or other device. In some embodiments of this invention, the planar space is defined by a length equal to the longitudinal movement of loading arm 37 with respect to transfer station 50, such as along longitudinal axis 38, a depth equal to the lifting and lowering movement of lifter 36 such as in a vertical direction, and a width equal to a width dimension of loading arm 37.

In some embodiments, machine table 10 receives or otherwise accepts pallet 20 and then moves and/or performs work on workpiece 12, and then machine table 10 returns pallet 20 with the attached and already worked or modified workpiece 12. In some embodiments of this invention, such as shown in FIGS. 1-5, the delivery system moves an active carrier 25' of carriers 25 from transfer station 50 to machine table 10, preferably but not necessarily along a linear travel path which may or may not be generally parallel to longitudinal axis 38. The delivery system of this invention, in some embodiments, positions active carrier 25' at transfer station 50 and then loading arm 37 moves to lift and/or otherwise remove active pallet 20' of pallets 20 so that active pallet 20' moves away from active carrier 25', which active carrier 25' remains movably attached and/or fixedly mounted with respect to conveyor 30, and delivers and receives active carrier 25' and a corresponding active pallet 20'.

According to some embodiments of this invention, each of carriers 25, including active carrier 25', remains movably attached or otherwise connected to conveyor 30, so that active pallet 20' easily moves away from active carrier 25' without each of carriers 25, including active carrier 25' moving away from conveyor 30, particularly when loading arm 37 or another suitable displacement device lifts or otherwise picks up and moves active pallet 20 away from transfer station 50. In some embodiments of this invention, each of carriers 25, including active carrier 25', is able to move along conveyor 30 but not detach or derail from conveyor 30.

Figure 8:
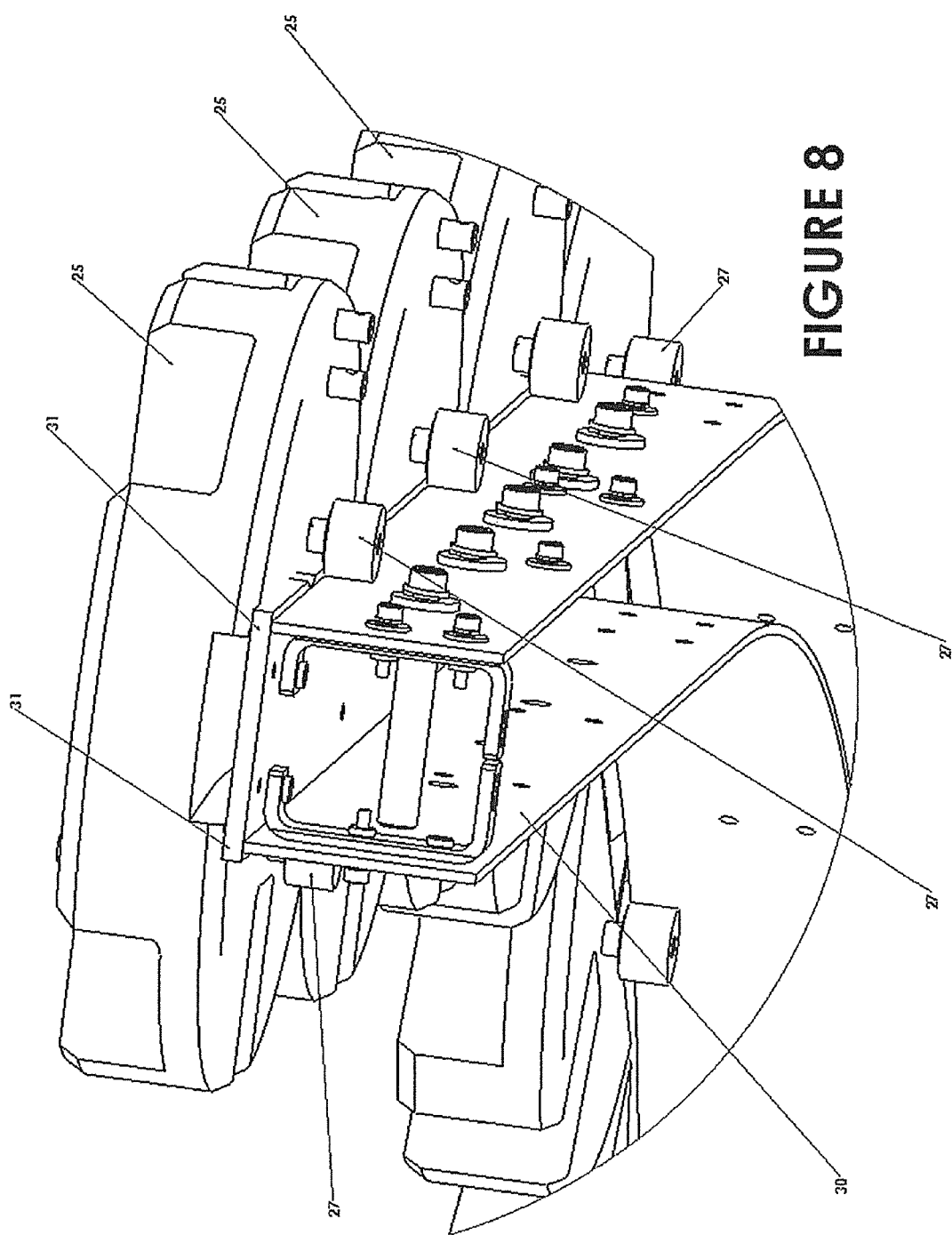
FIG. 8 is a perspective view of carriers mounted with respect to a conveyor, according to one embodiment of this invention.
Figure 9:
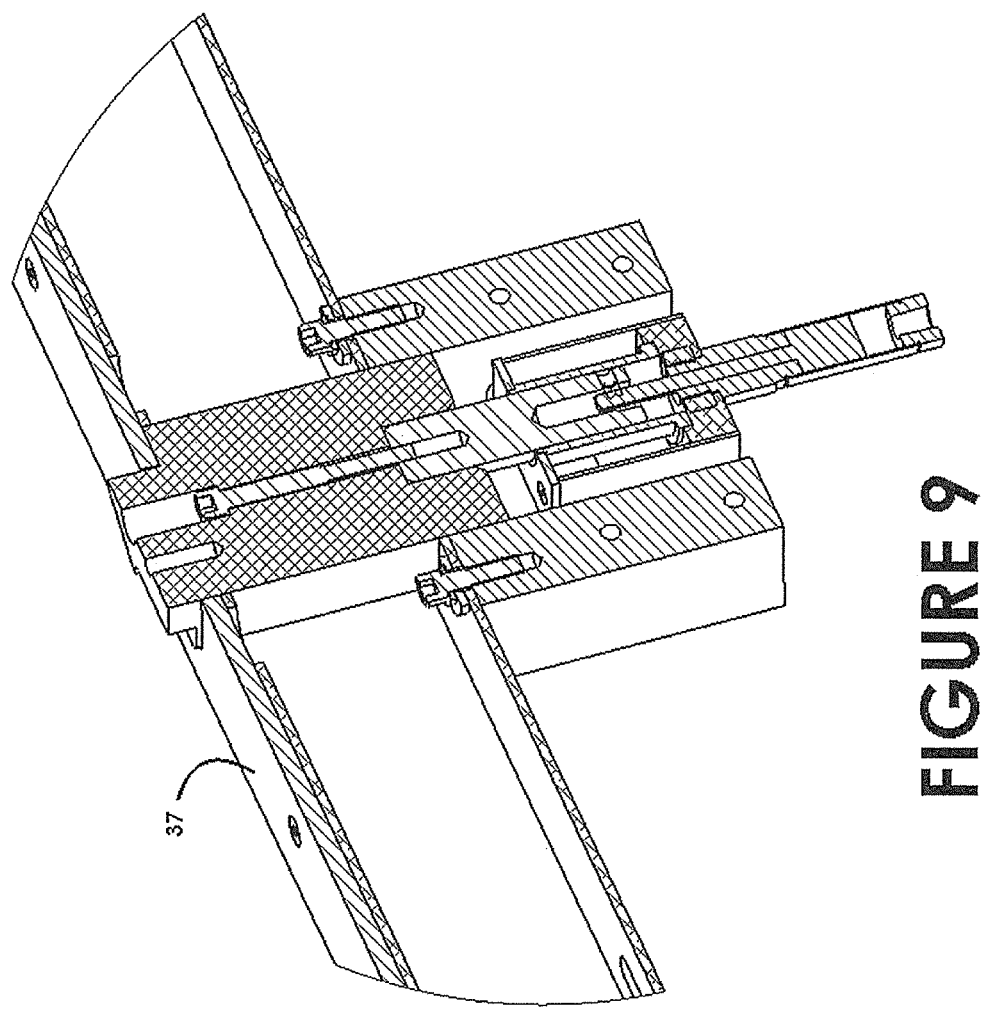
FIG. 9 is a perspective partial sectional view of a loading arm, according to one embodiment of this invention.
Figure 38:
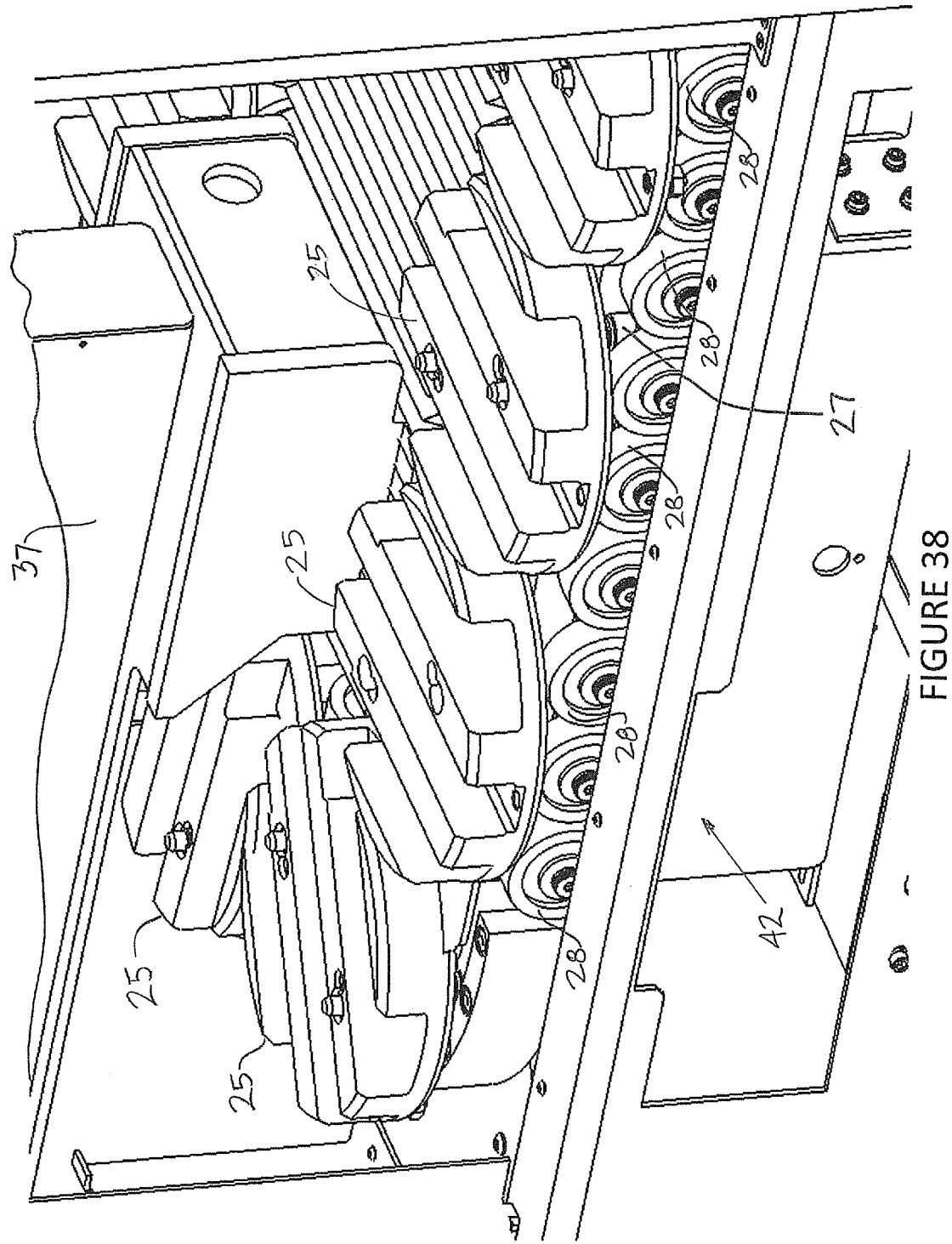
FIG. 38 is a perspective partial view of an apparatus for delivering and retrieving workpieces, according to another embodiment of this invention.
Figure 39:
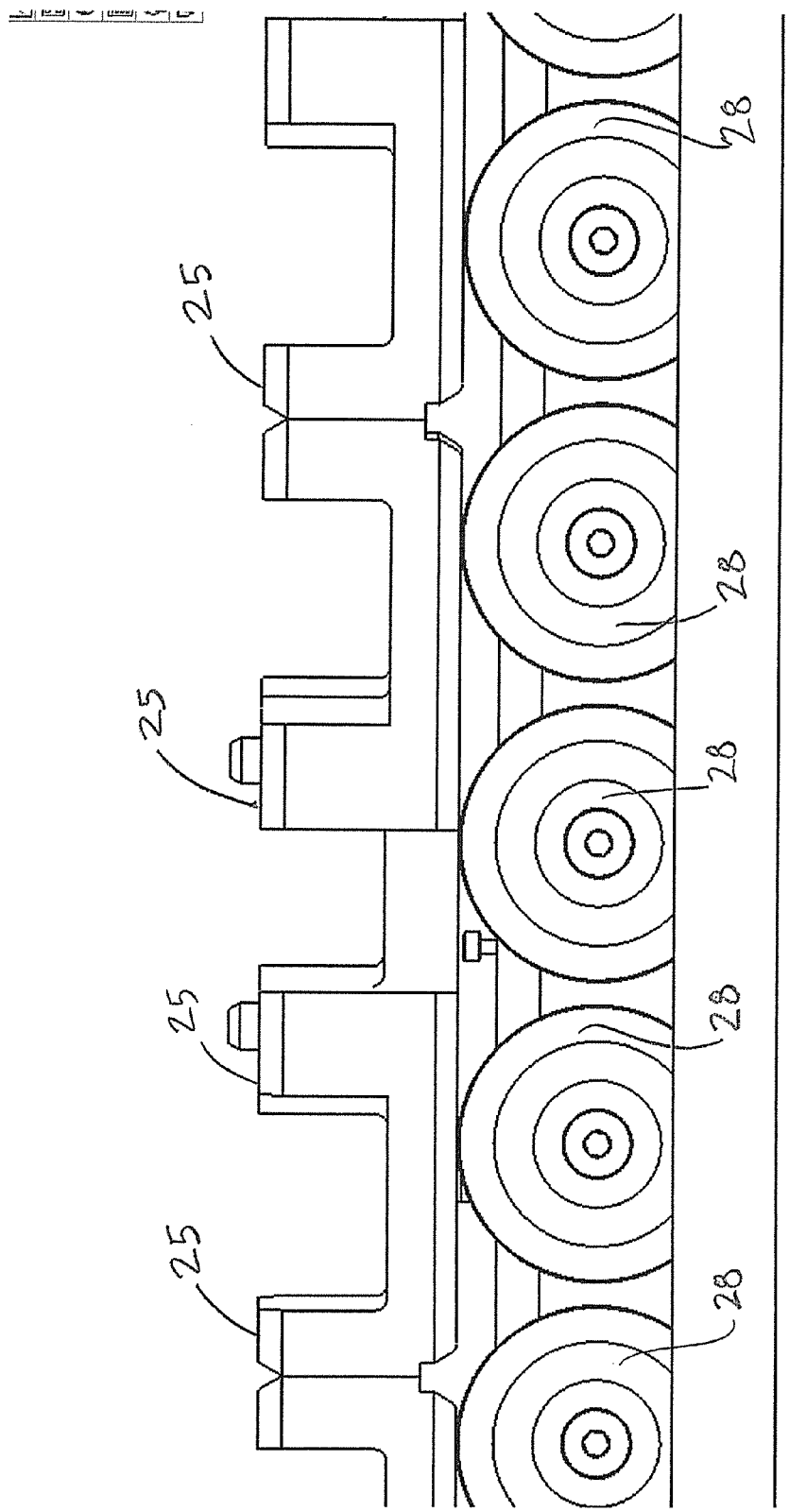
FIG. 39 is a perspective view of carriers mounted with respect to a conveyor, according to one embodiment of this invention.

FIGS. 8, 38 and 39 show different embodiments of carriers 25 movably mounted with respect to conveyor 30. As shown in FIG. 8, rollers 27 are secured or otherwise attached to each carrier 25, including active carrier 25', preferably but not necessarily on opposing sides of conveyor 30. As shown in FIG. 8, roller 27 contacts edge 31 of conveyor 30, to allow carrier 25 to move or translate along conveyor 30 without each of carriers 25, including active carrier 25', being detached, derailed or otherwise removed from conveyor 30 as each of carriers 25, including active carrier 25', translates or moves with respect to conveyor 30. As shown in FIGS. 37-39, according to different embodiments of this invention, one or more rollers 28 each is rotatably mounted and/or otherwise attached directly or indirectly with respect to conveyor 30 in any suitable manner that allows rotation of roller 28 with respect to carrier 25 and/or conveyor 30. Also as shown in FIGS. 37-39, as carrier 25 moves with respect to conveyor 30, a contact surface of roller 28 makes contact, such as rolling contact, with carrier 25, for example, a bottom surface of carrier 25. FIG. 37 shows multiple rollers 28 rotatably mounted along conveyor 30 and with rollers 28 spaced with respect to each other to provide sufficient support to the bottom surfaces of carriers 25. Each roller 28 can be used to significantly reduce frictional forces caused by or resulting from carrier 25 moving with respect to conveyor 30. Each roller 28 can also be used to reduce forces necessary to move several carriers 25 along conveyor 30. Many other different mechanical, electrical and/or magnetic devices can be used to accomplish the same result of moving each of carriers 25, including active carrier 25', without detaching each of carriers 25, including active carrier 25', from conveyor 30.

In some embodiments according to this invention, mover 40 engages and moves at least one carrier 25 with respect to conveyor 30 and movement of the at least one carrier 25 engages and moves, directly or indirectly, active carrier 25' into or at a position located at or near transfer station 50, so that loading arm 37 can reach and act on active carrier 25'. In some embodiments of this invention, displacement or other movement of mover 40 causes movement of one carrier 25 that then moves an adjacent carrier 25, which moves another adjacent carrier 25 or active carrier 25', and so on, such as into or to transfer station 50.

FIG. 1 shows about 15-20 different carriers 25 mounted on conveyor 30 on horizontal level 17, with about 15 carriers 25 positioned on a relatively larger section 33 of conveyor 30 and about 6 carriers 25 positioned on a relatively smaller section 34 of conveyor 30. As shown in FIG. 1, mover 40 is in an unload or moved position, contacting and displacing one carrier 25 in a downline direction of conveyor 30, which according to some embodiments of this invention takes place or occurs at push station 52. In some embodiments according to this invention, at push station 52, mover 40 moves between a load position and the unload or moved position shown in FIG. 1. As mover 40 moves back to a load position, at push station 52, mover 40 positions itself at an upline position within push station 52, so that mover 40 is ready to move in a downline direction the next carrier 25 moved or otherwise positioned within the vacant space of push station 52 which is shown in FIG. 1. FIG. 1 shows mover 42 in an upline position, ready to push or otherwise move the one carrier 25 which is positioned within smaller section 34 of conveyor 30. As shown in FIGS. 4 and 5, as mover 42 moves or otherwise pushes carrier 25 in a downline direction, one interval or one space, carrier 25 farthest away from mover 42 is pushed or moved into the vacant space of push station 52, as shown in FIGS. 4 and 5. Movement of mover 42 in the downline direction also causes the next active carrier 25' to move at or within transfer station 50.

Figure 10:
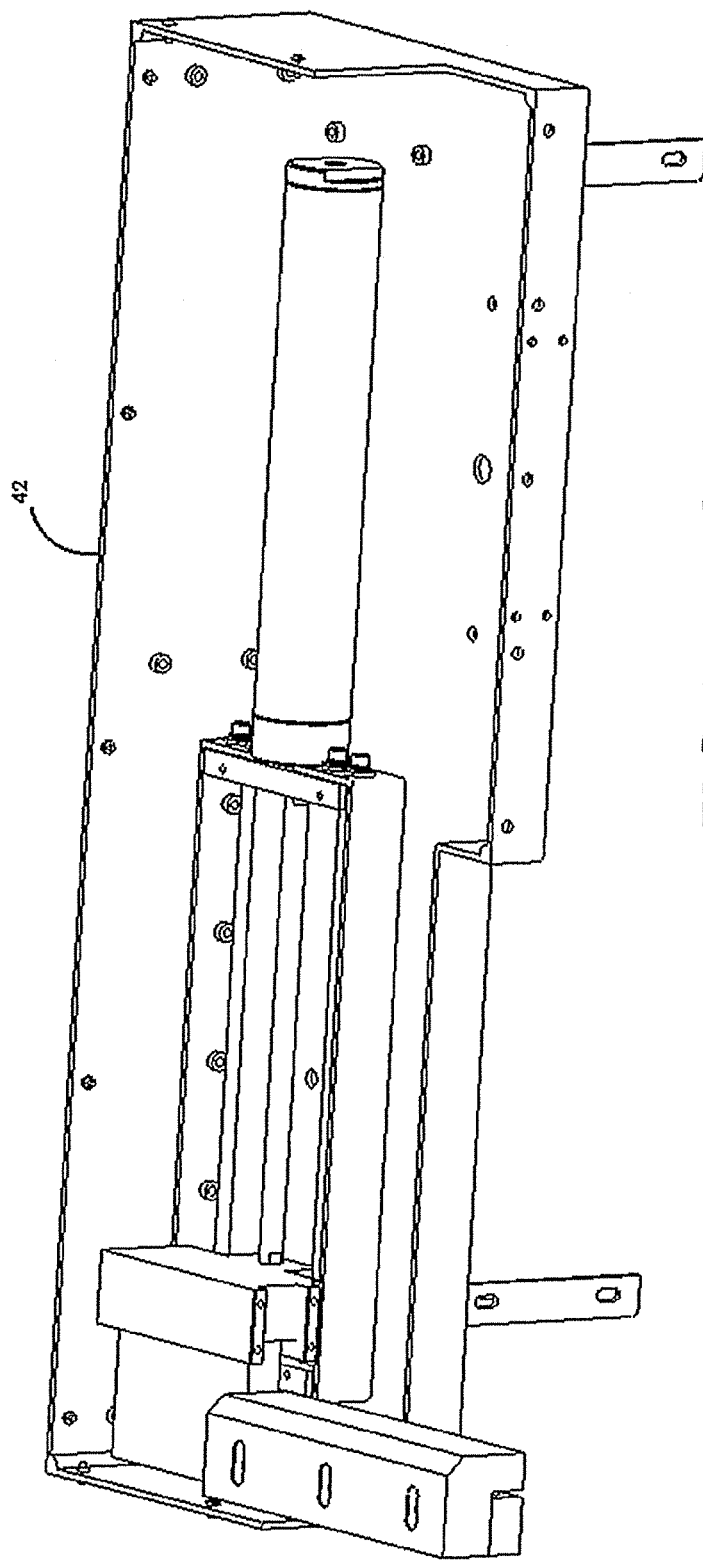
FIG. 10 is a perspective view of a push device, according to one embodiment of this invention.
Figure 11:
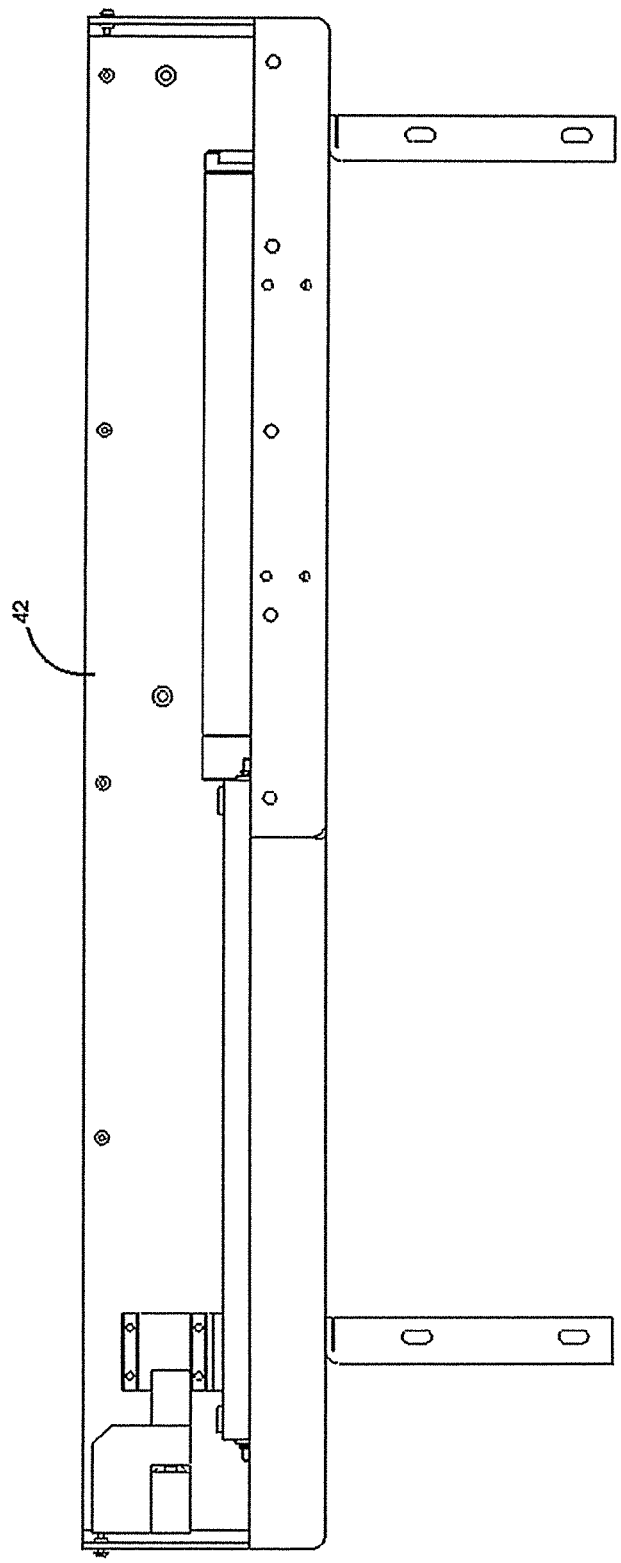
FIG. 11 is a front view of a push device, according to one embodiment of this invention.

In some embodiments of this invention, mover 40 and/or mover 42 can comprise any suitable apparatus or system that moves an element along a specified distance and which is connected directly and/or indirectly with respect to carrier 25 and/or carrier 25'. According to some embodiments of this invention, such as shown in FIGS. 10 and 11, mover 40 and/or mover 42 comprises a piston type actuator or cylinder that is preferably but not necessarily pneumatically operated and/or actuated to move a corresponding piston rod a particular distance. In some embodiments of this invention, such as shown in FIG. 37, mover 40 and/or mover 42 comprises a servo motor or servo actuator that is operated to move the element a particular distance. In other embodiments according to this invention, mover 40 and/or mover 42 comprises any other suitable actuator that can move the element along a particular distance.

According to some embodiments of this invention, such as shown in FIG. 5, mover 40 and mover 42 are positioned opposing each other at one end or side of a frame holding or securing conveyor 30. According to other embodiments of this invention, such as shown in FIG. 37, mover 40 and mover 42 are positioned at opposing corners of the frame holding or securing conveyor 30. It is possible to use any suitable number and/or positioning of mover 40 and/or mover 42, depending upon the number of carriers 25 and/or the layout of conveyor 30.

In some embodiments according to this invention, either push station 52 or push station 54 needs to be a vacant space and the other needs to simultaneously be a filled space, filled with one carrier 25. In such embodiments, movement of push station 54 moves the next active carrier 25' into position at transfer station 50 and also moves one carrier 25 into the vacant space of push station 52, as shown in FIGS. 4 and 5. Then, as push station 54 moves the one carrier 25 in to occupy the vacant space of push station 52, the one carrier 25 moves in the downline direction and causes several other downline carriers 25 to move along conveyor 30, which results in moving one carrier 25 in to occupy the vacant space of push station 54.

In some embodiments according to this invention, a set of first carriers 25 move with respect to conveyor 30 and the first set of carriers 25 are positioned within a first horizontal level 17, such as shown in FIG. 1. In other embodiments according to this invention, another set of carriers 25 move with respect to a second conveyor 30' and the other set the carriers 25 as well as second conveyor 30' are positioned within a second horizontal level 18, such as shown in FIG. 1. As shown in FIG. 1, carriers 25 are moved within conveyor 30 in first horizontal level 17 and are moved within conveyor 30' and second horizontal level 18. In other embodiments according to this invention, one or more sets of carriers 25 can be positioned within even higher horizontal levels of conveyors.

As shown in FIG. 1, first horizontal level 17 is spaced at a distance 16 with respect to second horizontal level 18. Any other suitable distance 16 can be used between first horizontal level 17 and second horizontal level 18. Different dimensions can be used depending on the different configurations of workpieces 12. In some embodiments of this invention that contain more than 2 horizontal levels, each can be separated by a same distance 16 or by a different distance 16. Stacking horizontal levels of conveyors 30 according to this invention increases the volume of carriers 25 that can be used and thus more workpieces 12, all within the same footprint of the delivery system of this invention.

In some embodiments of this invention, push station 52 can also include a lift or a lift station for raising and lowering or otherwise moving carriers 25 between first horizontal level 17 and second horizontal level 18, as well as any higher, lower or additional horizontal level. As shown in FIG. 1, portion 32 of conveyor 30 comprises a corner section of conveyor 30 that moves, for example, that can be raised and/or lowered between first horizontal level 17 and second horizontal level 18, as well as any higher, lower or additional horizontal level, to move several or multiple carriers 25, each with secured workpieces 12, between first horizontal level 17 and second horizontal level 18, as well as any higher, lower or additional horizontal level. This arrangement provides the capability of accommodating many more carriers 25, for a given machine footprint, and thus more workpieces 12, for example, to be delivered to machine table 10.

In some embodiments of this invention, the lift or the lift station for raising and lowering or otherwise moving carriers 25 comprises any suitable lift, lift device, elevator and/or any other suitable apparatus, device and/or method that raises, lowers and/or otherwise moves one or more carriers 25 between any two different horizontal levels of conveyors 30. As shown in FIG. 1, portion 32 of conveyor 30 can move to lower and/or raise at least one carrier 25 between any two different horizontal levels of conveyors 30.

In different embodiments according to this invention, including the embodiment shown in FIG. 1, multiple horizontal levels of conveyors 30 can be used and with the elevators, lifts and/or lift stations, and there is no need to vertically move loading arm 37 to any of the higher, lower or other horizontal levels. In some embodiments of this invention, loading arm 37 remains at first horizontal level 17, which can significantly reduce the cost of manufacturing and using the delivery system according to this invention, particularly the loading arm or other similar device.

Loading arm 37 and/or other elements or components of the delivery system, according to some embodiments of this invention, are used to move, transfer, transport and/or otherwise locate or position workpiece 12, preferably but not necessarily attached to pallet 20, to machine table 10. In some embodiments, machine table 10 can be an existing machine table or can be a new machine table. Receiver 60 according to this invention can be installed at and/or used with any suitable existing machine table or a new machine table 10. Receiver 60 according to this invention can receive workpieces 12 which are delivered to and retrieved by actuator 35 of the delivery system according to this invention.

Figure 14:
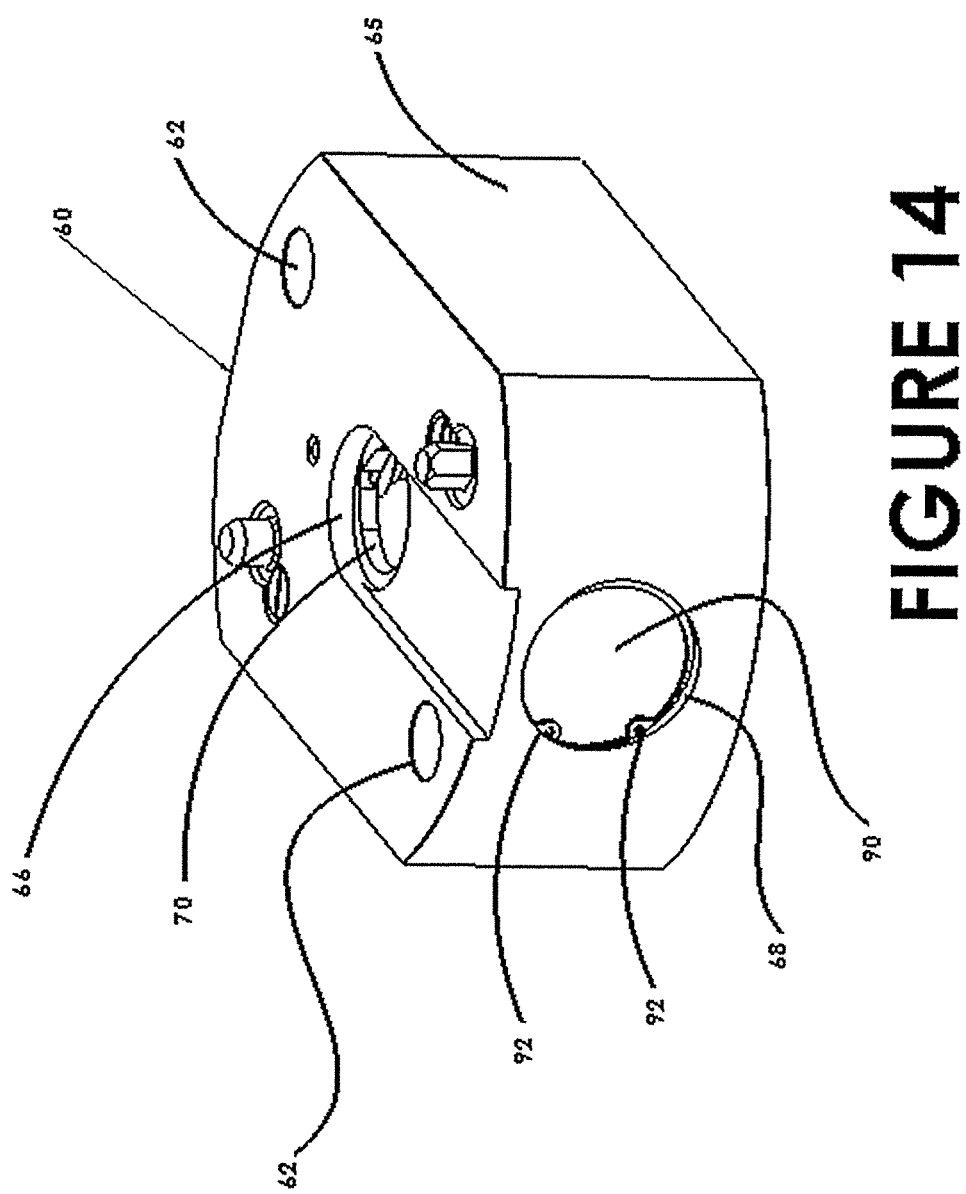
FIG. 14 is a perspective view of a receiver, according to one embodiment of this invention.

FIG. 12 shows a disengaged or disassembled view of pallet 20 and receiver 60. FIG. 13 shows an engaged or assembled view of pallet 20 and receiver 60. FIG. 14 shows a perspective view of only receiver 60, according to one embodiment of this invention. Any receiver 60 having features according to this invention can be used with an existing machine table 10 or a new machine table 10.

In some embodiments of this invention, receiver 60 has receiver body or housing 65 forming cavity 67 and bore 66 which is in communication with cavity 67. Receiver 60 can be detachably or releasably secured or otherwise removably attached with respect to one or more suitable elements of machine table 10. For example, FIGS. 15 and 16 show mounting bores 62 that can be used to secure or attach housing 65 of receiver 60 with respect to machine table 10.

As shown in FIGS. 18, 22, 35 and 36, at least one pivot arm 70 is pivotally mounted with respect to receiver housing 65. In some embodiments of this invention, two pivot arms 70 are both pivotally mounted and positioned within cavity 67 and both pivot arms 70 move relative to each other, such as in a fashion similar to the movement of scissor arms within scissors or tweezer arms within tweezers. FIGS. 15, 16, 18 and 22 show two pivot arms 70 each pivotally mounted about common pivot shaft 75. In other embodiments according to this invention, each pivot arm 70 can be pivotally mounted about a different pivot shaft and/or can be pivotally mounted to move in a similar fashion with respect to each other.

Figure 15:
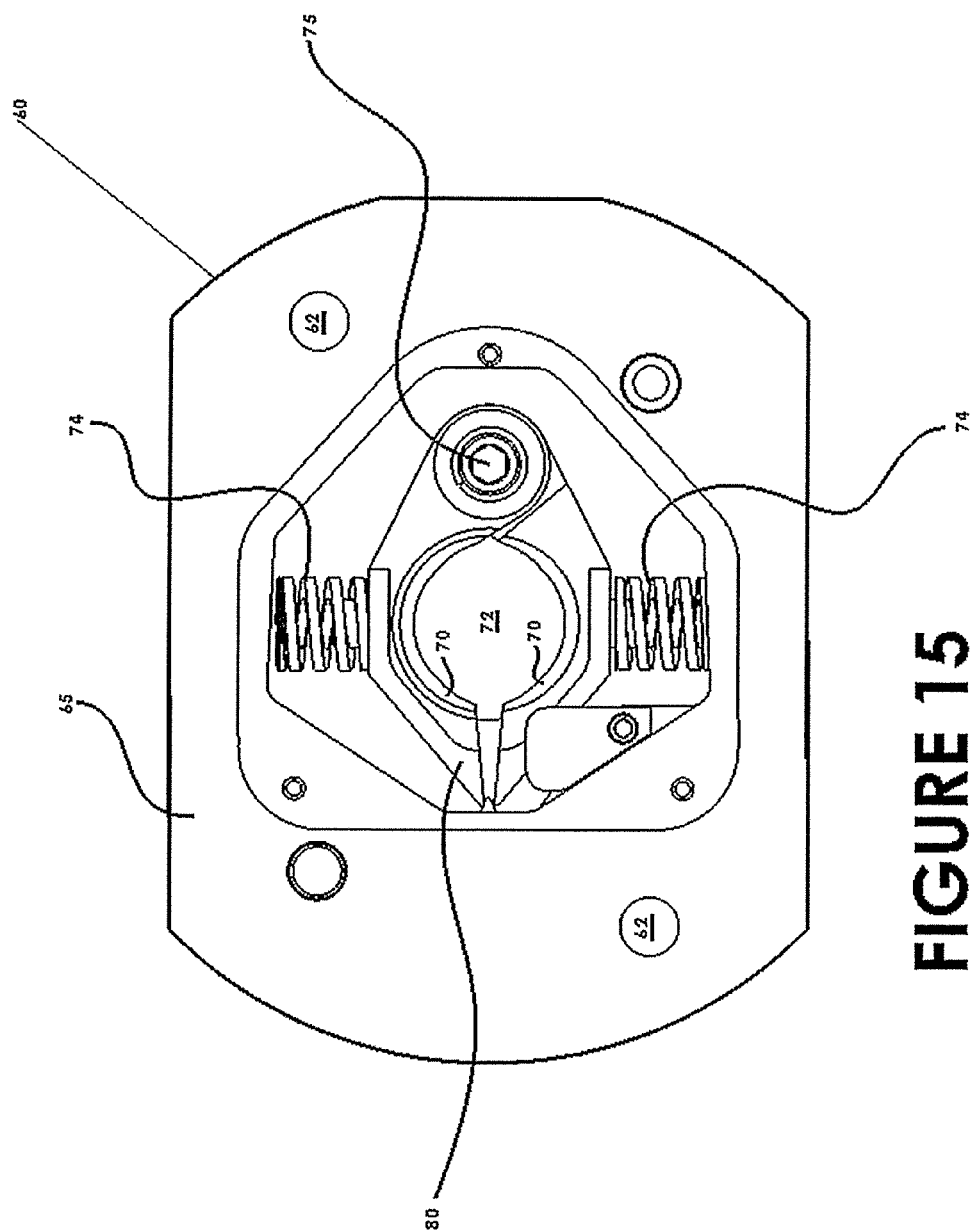
FIG. 15 is a top view of a receiver, with a spreader in a first position, according to one embodiment of this invention.
Figure 16:
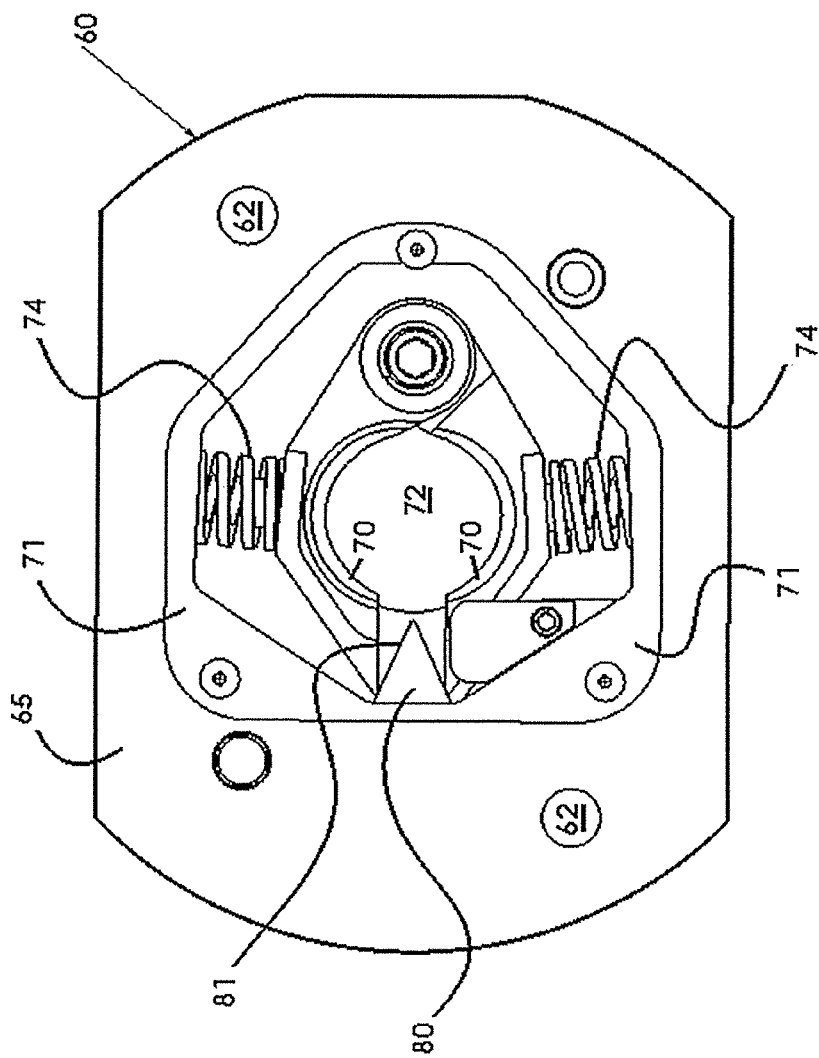
FIG. 16 is a top view of a receiver, with a spreader and a second position, according to one embodiment of this invention.

FIGS. 15 and 16 each shows two different positions of spreader 80 with respect to pivot arms 70. In some embodiments of this invention, pivot arms 70 form opening 72 between both pivot arms 70. FIG. 15 shows a first position of spreader 80 contacting both pivot arms 70 and creating a first size of opening 72. FIG. 16 shows a second position of spreader 80 contacting both pivot arms 70 and creating a second size of opening 72 which is larger than the first size of opening 72 as shown in FIG. 15. In some embodiments of this invention, connector 85 is positioned within opening 72 and a smaller sized opening 72 can be used to cause at least one pivot arm 70 and preferably but not necessarily two pivot arms 70 to contact and lock, hold and/or fix a position of connector 85 with respect to receiver housing 65. In some embodiments of this invention, each pivot arm 70 can be moved with respect to housing 65 to create a larger size of opening 72 and thus release connector 85 or otherwise allow connector 85 to move with respect to receiver housing 65. Any other suitable designs, arrangements and/or dimensions can be used to cause opening 72 to move between a smaller size and the larger size.

In some embodiments of this invention, spreader 80 is movably mounted with respect to receiver housing 65. For example, as shown between FIGS. 15 and 16, spreader 80 is moved between two positions with respect to receiver housing 65 and thus causes the differently sized openings 72 between pivot arms 70. As shown in FIG. 16, spreader 80 contacts two pivot arms 70 and movement of spreader 80 in two different directions results in opening or closing both pivot arms 70 with respect to each other to provide different sizes of openings 72.

In some embodiments according to this invention, plunger 90, such as shown in FIGS. 14 and 17, is movably mounted with respect to receiver housing 65 and is connected to spreader 80. Moving plunger 90 thus moves spreader 80 and causes relative movement between pivot arms 70. FIG. 14 shows receiver housing 65 having opening 68 through which movable plunger 90 is accessible. In some embodiments of this invention, retainer 92 is fixed or secured with respect to opening 68 and receiver housing 65, to retain plunger 90 within receiver housing 65. Any other suitable retaining device can be used to movably retain plunger 90 within receiver housing 65. In some embodiments of this invention, actuator 35 of the delivery system has a design and shape, such as a push element, which is connected directly or indirectly to pallet 20, and as pallet 20 arrives at machine table 10, actuator 35 enters opening 68 and pushes or otherwise moves plunger 90 and thus spreader 82 responsively moves to open or enlarge opening 72 between pivot arms 70.

Figure 22:
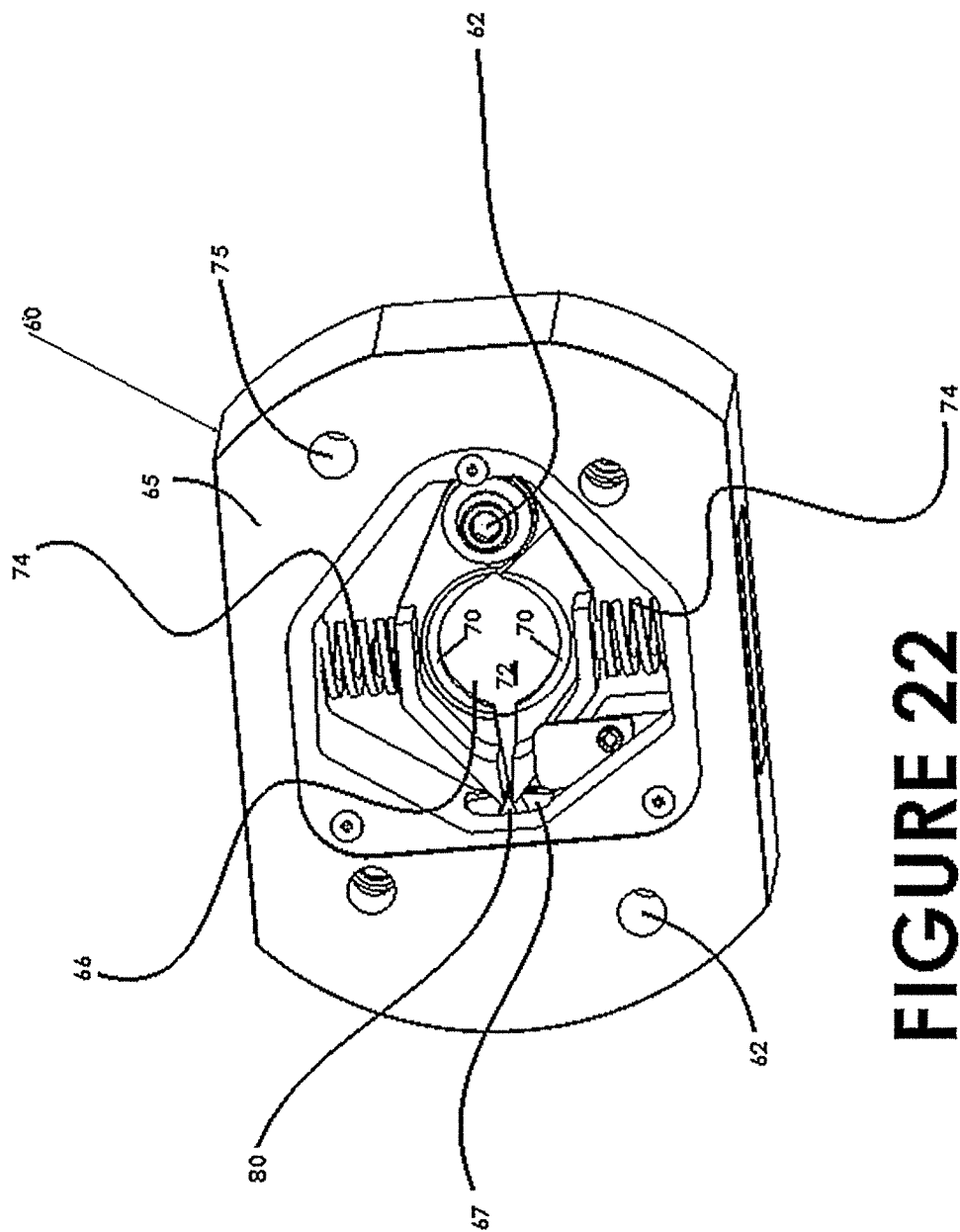
FIG. 22 is a perspective view of a receiver, according to one embodiment of this invention.
Figure 23:
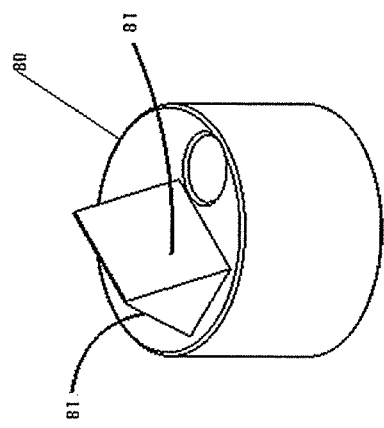
FIG. 23 is a perspective view of a spreader, according to one embodiment of this invention.
Figure 26:
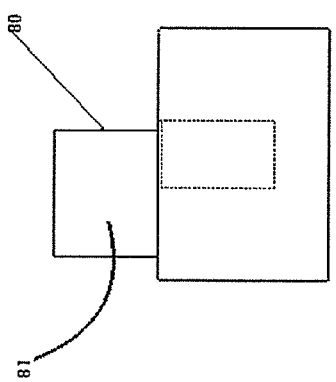
FIG. 26 is a side view of a spreader, according to one embodiment of this invention.
Figure 25:
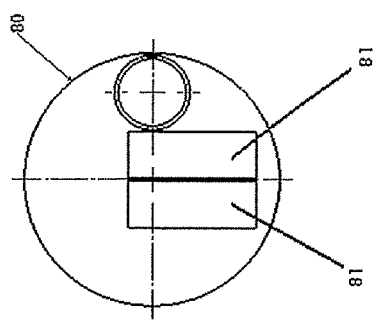
FIG. 25 is a top view of a spreader, according to one embodiment of this invention.
Figure 24:
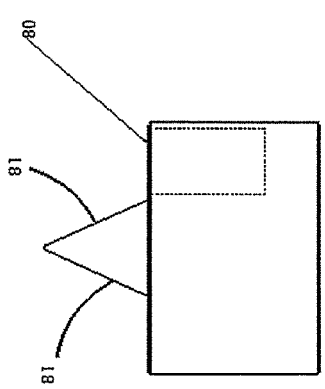
FIG. 24 is a front view of a spreader, according to one embodiment of this invention.
Figure 29:
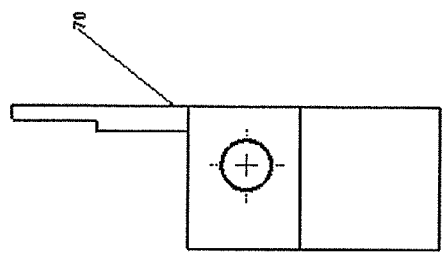
FIG. 29 is a side view of a pivot arm, according to one embodiment of this invention.
Figure 28:
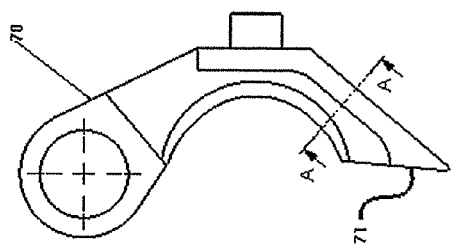
FIG. 28 is a front view of a pivot arm, according to one embodiment of this invention.
Figure 30:
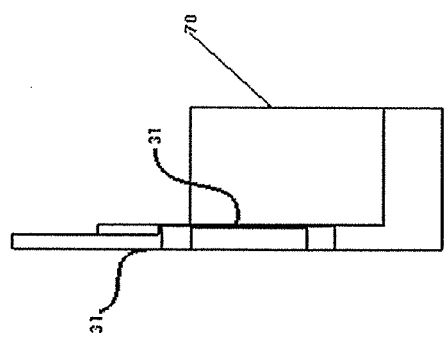
FIG. 30 is a side view of a pivot arm, according to one embodiment of this invention.
Figure 31:
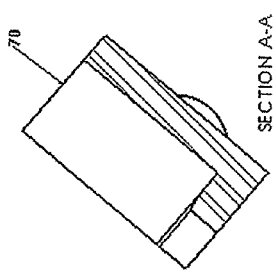
FIG. 31 is a sectional view, taken along line 31-31 as shown in FIG. 30, of a pivot arm, according to one embodiment of this invention.
Figure 27:
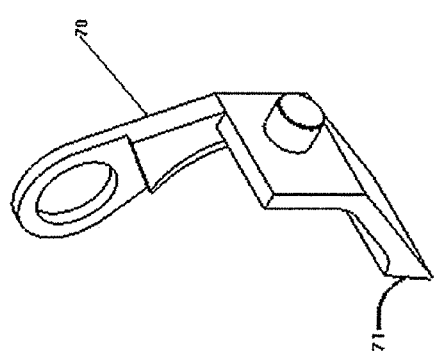
FIG. 27 is a perspective view of a pivot arm, according to one embodiment of this invention.

According to some embodiments of this invention, at least one bias element 74 is mounted with respect to receiver housing 65 and normally forces each pivot arm 70 into a locked position in which pivot arm 70 interferes with and detachably locks connector 85 within bore 66 of receiver housing 65. FIGS. 18 and 22, for example, show each pivot arm 70 having one bias element 74 contacting the corresponding pivot arm 70. In some embodiments of this invention, moving spreader 80 from the first position shown in FIG. 15 to the second position shown in FIG. 16 causes pivot arms 70 to move against the bias force of bias elements 74. In such embodiments, each bias element 74 normally biases pivot arm 70 into a normally locked position of connector 85 within bore 68. Moving spreader 80 against the force of bias elements 74 can move pivot arm 70 into an open position or an unlocked position in which connector 85 can be released from within bore 68.

FIGS. 15, 16, 18 and 22, for example, show each bias element 74 as a coil spring. However, any other suitable bias element and/or spring element can be used in place of or in addition to bias element 74 as shown in the drawings.

FIGS. 23-26 show one embodiment of spreader 80, according to this invention. Spreader 80 has contact surface 81 which contacts a corresponding or mating contact surface 71 of pivot arm 70. In some embodiments of this invention, spreader 80 forms a wedge shaped element. FIGS. 27-31 show one embodiment of one pivot arm 70, according to this invention, and having contact surface 71. Any other suitable design and/or dimension of spreader 80 and/or pivot arm 70 can be used in addition to or in place of those elements as described in the specification and as shown in the drawings, and still accomplish the result of spreader 80 being able to move pivot arms 70, either in an opening or closing direction, with respect to each other.

Figure 34:
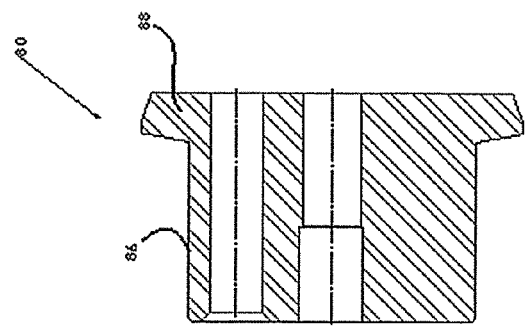
FIG. 34 is a sectional view of a connector, according to one embodiment of this invention.
Figure 33:
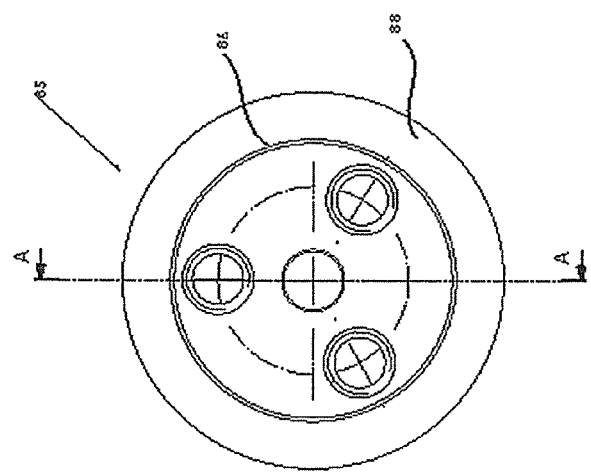
FIG. 33 is a front view of a connector, according to one embodiment of this invention.
Figure 32:
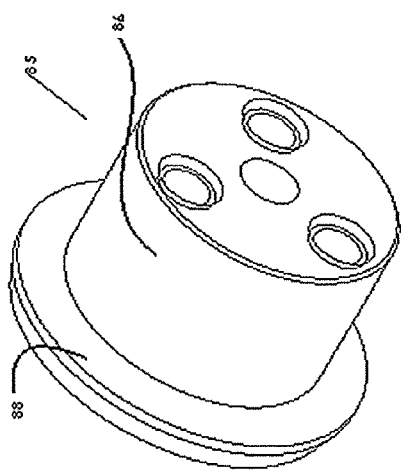
FIG. 32 is a perspective view of a connector, according to one embodiment of this invention.

FIGS. 32-34 show connector 85, according to one embodiment of this invention, in which connector 85 has post 86 extending away from and forming collar 88. In some embodiments, connector 85 is secured or otherwise attached to pallet 20, preferably but not necessarily in a manner that secures connector 85 with respect to pallet 20. Any other suitable design and/or dimensions can be used in place of or in addition to the features of connector 85 and/or pallet 20, and still accomplish the result of connector 85 and thus pallet 20 being locked and unlocked with respect to housing body 65, by movement of pivot arms 70.

Figure 35:
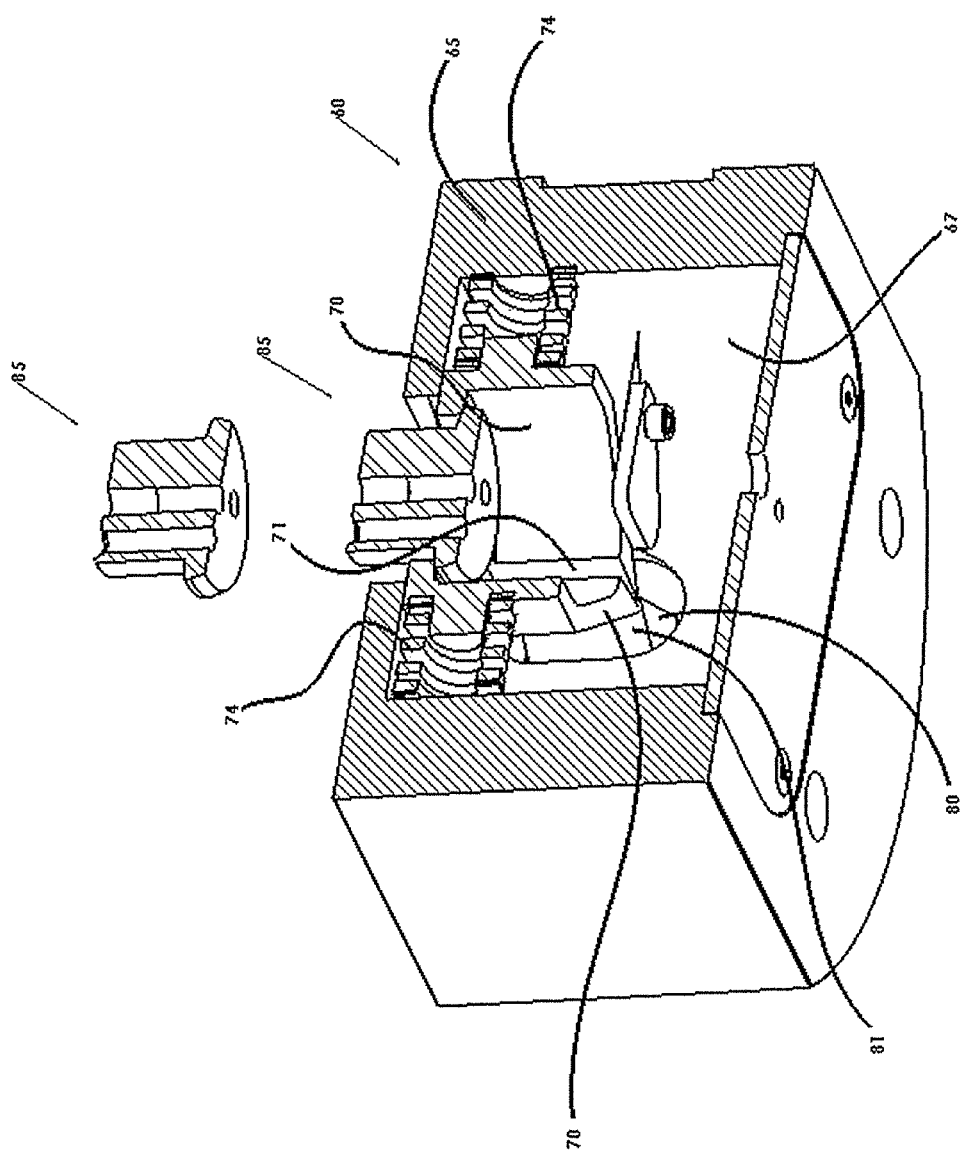
FIG. 35 is a partial perspective view of a receiver and a connector, in both an engaged position and a disengaged position, according to one embodiment of this invention.
Figure 36:
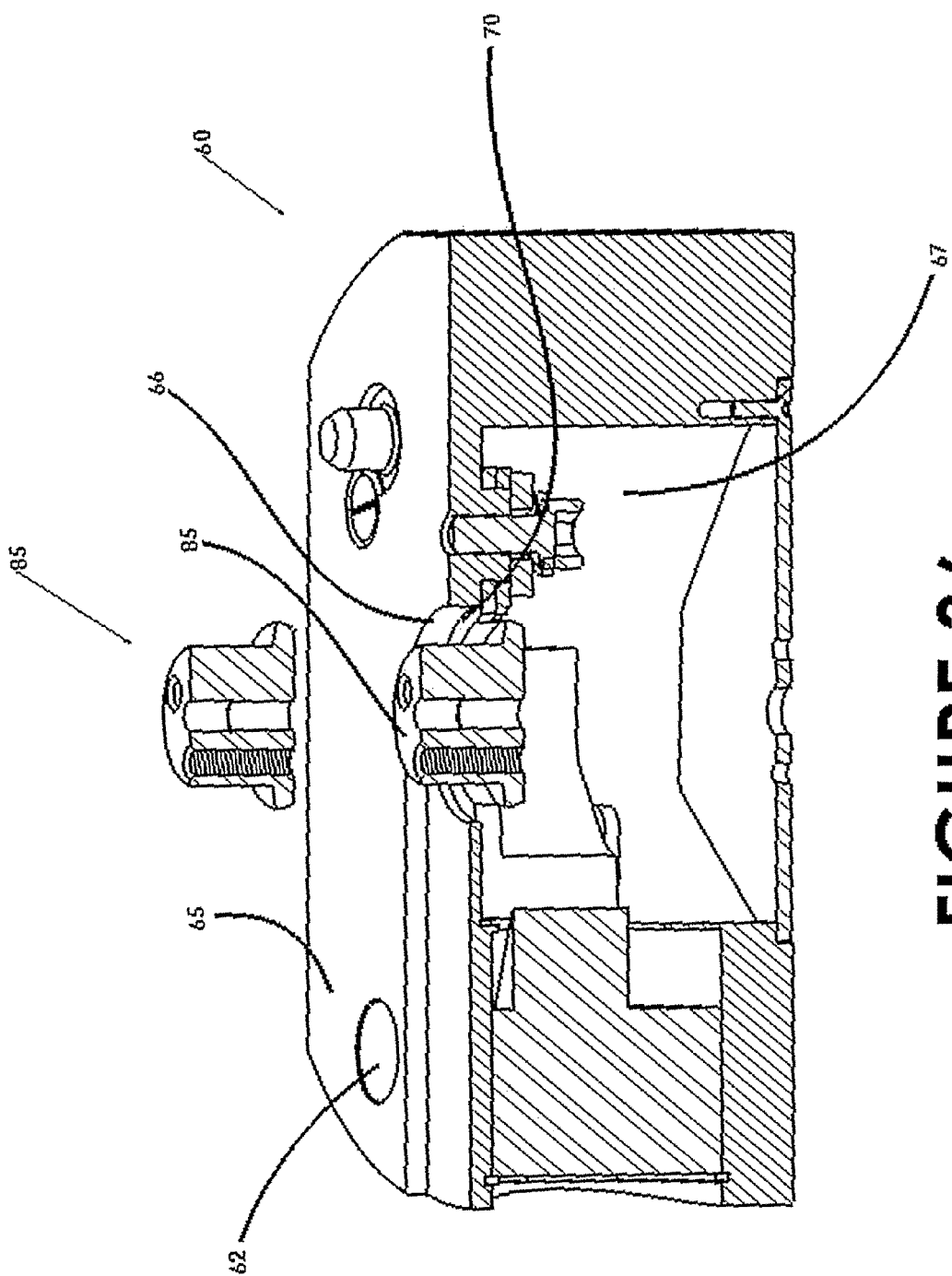
FIG. 36 is a partial perspective view of a receiver and a connector, in both an engaged position and a disengaged position, according to one embodiment of this invention.

FIGS. 35 and 36 show different perspective views of embodiments of receiver 20, according to this invention. Each of FIGS. 35 and 36 show a double image or drawing of connector 85, with one image or drawing of connector 85 shown in a locked position within bore 66 of receiver housing 65, and with another image or drawing of connector 85 shown in an unlocked position in which connector 85 is shown above and away from receiver 20.

In some embodiments according to this invention, a method for receiving workpieces 12 at machine table 10, which are delivered to and retrieved by the delivery system includes removably mounting receiver 60 with respect to machine table 10. Actuator 35 of the delivery system is moved to engage actuator 35 with spreader 80 and thus move spreader 80 with respect to at least one pivot arm 70, for example, to expose bore 66 of receiver housing 65 so that connector 85 attached to pallet 20 is moved and mounted within opening 72 formed by pivot arms 70. Pivot arms 70 can then be moved into the locked position to interfere with and thus detachably lock connector 85 with respect to receiver housing 65.

In some embodiments of this invention, actuator 35 is moved within bore 66 and then each pivot arm 70 is moved to release connector 85 from within bore 66. In some embodiments of this invention, moving spreader 80 in a first direction opens pivot arms 70 with respect to each other into an unlocked position that detachably unlocks connector 85 from within bore 66.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention.

What is claimed is:

1. A method for delivering and retrieving workpieces to and from a machine table, the method including the steps of:
securing each of the workpieces with respect to a corresponding one of a plurality of pallets;
removably mounting each of the pallets to a corresponding one of a plurality of carriers;
moving the carriers with respect to a conveyor;
positioning an active carrier of the carriers at a transfer station; and
moving along a linear travel path the active carrier from the transfer station to the machine table.

2. The method according to claim 1, wherein a loading arm moves along the linear travel path between the transfer station and the machine table and delivers and receives the active carrier and a corresponding active pallet of the pallets.

3. The method according to claim 1, further comprising a first mover engaging and moving at least one first carrier of the carriers with respect to the conveyor and the at least one first carrier moving the active carrier to the transfer station.

4. The method according to claim 3, wherein moving the first mover contacts and moves each said first carrier in a downline direction of the conveyor.

5. The method according to claim 3, further comprising a second mover engaging and moving the at least one first carrier with respect to the conveyor and at least two of the first carriers contacting each other and one of the first carriers contacting and moving the active carrier to the transfer station.

6. The method according to claim 1, further comprising first carriers of the carriers moving with respect to the conveyor positioned within a first horizontal level and the first carriers moving with respect to a second conveyor positioned within a second horizontal level that is a vertical distance away from the first horizontal level.

7. The method according to claim 6, further comprising a lift station moving the first carriers between the conveyor within the first horizontal level and the second conveyor within the second horizontal level.

8. The method according to claim 1, further comprising a push station located along the conveyor and the push station forcing and moving one of first carriers of the carriers in a downline direction of the conveyor.

9. The method according to claim 1, further comprising a loading arm engaging and raising the active carrier, moving the active carrier along the linear travel path, and delivering an active pallet of the pallets to a receiver positioned at the machine table.

10. An apparatus for delivering and retrieving workpieces to and from a machine table, the apparatus comprising:
a plurality of pallets, each said workpiece releasably secured with respect to a corresponding one of the pallets, a plurality of carriers each removably mounted with respect to the corresponding pallet, a conveyor, the carriers moving along the conveyor, a transfer station positioned along the conveyor, a first mover engaging and moving at least one first carrier of the carriers with respect to the conveyor and the at least one first carrier positioning an active carrier of the carriers at a transfer station, a loading arm movably mounted along a linear travel path between the transfer station and the machine table and delivering and receiving the active carrier and a corresponding active pallet of the pallets.

11. The apparatus according to claim 10, wherein the loading arm moves in only two dimensions within a planar space between the transfer station and the machine table.

12. The apparatus according to claim 10, wherein the conveyor forms a continuous loop around which the first carriers move.

13. The apparatus according to claim 10, wherein the first carriers each has at least one roller engaging the conveyor.

14. The apparatus according to claim 10, wherein the first mover is movable to contact and force movement of each said first carrier in a downline direction of the conveyor.

15. The apparatus according to claim 10, further comprising a second mover engaging and moving the at least one first carrier with respect to the conveyor and at least two of the first carriers contacting each other and one of the first carriers contacting and moving the active carrier to the transfer station.

16. The apparatus according to claim 10, wherein the first carriers move with respect to the conveyor positioned within a first horizontal level and the first carriers move with respect to a second conveyor positioned within a second horizontal level spaced at a vertical distance away from the first horizontal level.

17. The apparatus according to claim 16, further comprising a lift station moving the carriers between the conveyor within the first horizontal level and the second conveyor within the second horizontal level.

18. The apparatus according to claim 10, further comprising a push station located along the conveyor and the push station forcing and moving one of the first carriers in a downline direction of the conveyor and causing the active carrier to move to the transfer station.

19. The apparatus according to claim 10, wherein the loading arm engages and raises the active carrier, moves the active carrier along the linear travel path, and delivers an active pallet to a receiver positioned at the machine table.

* * * * *